(12) United States Patent
O'Donnell et al.

(10) Patent No.: US 11,976,576 B2
(45) Date of Patent: May 7, 2024

(54) THERMAL ENERGY STORAGE SYSTEM COUPLED WITH THERMAL POWER CYCLE SYSTEMS

(71) Applicant: Rondo Energy, Inc., Alameda, CA (US)

(72) Inventors: John Setel O'Donnell, Oakland, CA (US); Yusef Desjardins Ferhani, Menlo Park, CA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 18/142,564

(22) Filed: May 2, 2023

(65) Prior Publication Data

US 2023/0296034 A1    Sep. 21, 2023

Related U.S. Application Data

(63) Continuation-in-part of application No. 17/668,333, filed on Feb. 9, 2022, now Pat. No. 11,702,963, which
(Continued)

(51) Int. Cl.
*F01K 3/02* (2006.01)
*B63H 11/00* (2006.01)
(Continued)

(52) U.S. Cl.
CPC ............... *F01K 3/02* (2013.01); *B63H 11/00* (2013.01); *F01K 3/08* (2013.01); *F01K 3/186* (2013.01);
(Continued)

(58) Field of Classification Search
CPC ... F01K 3/02; F01K 3/08; F01K 3/186; F01K 13/02; F01K 15/00; F01K 11/02;
(Continued)

(56) References Cited

U.S. PATENT DOCUMENTS 1,700,542 A    1/1929    O'Donnell
2,833,532 A    5/1958    Ries
(Continued)

FOREIGN PATENT DOCUMENTS

AU    2012292959 B2    2/2016
AU    2016204109 B2    5/2018
(Continued)

OTHER PUBLICATIONS

English Translation CN-108612634-A (Year: 2018).*
(Continued)

*Primary Examiner* — Shafiq Mian
(74) *Attorney, Agent, or Firm* — Procopio, Cory, Hargreaves & Savitch LLP; Matt Rainey

(57) ABSTRACT

An energy storage system converts variable renewable electricity (VRE) to continuous heat at over 1000° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. In one application, the energy storage system provides higher-temperature heat to a conventional lower-temperature heat source to boost the temperature of a thermal power cycle working fluid to a turbine, thereby increasing efficiency of the power cycle.

11 Claims, 19 Drawing Sheets

Related U.S. Application Data is a continuation of application No. 17/537,407, filed on Nov. 29, 2021, now Pat. No. 11,603,776, and a continuation-in-part of application No. PCT/US2021/061041, filed on Nov. 29, 2021.

(60) Provisional application No. 63/434,919, filed on Dec. 22, 2022, provisional application No. 63/427,374, filed on Nov. 22, 2022, provisional application No. 63/378,355, filed on Oct. 4, 2022, provisional application No. 63/347,987, filed on Jun. 1, 2022, provisional application No. 63/338,805, filed on May 5, 2022, provisional application No. 63/337,562, filed on May 2, 2022, provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.
| | |
|---|---|
| *F01K 3/08* | (2006.01) |
| *F01K 3/18* | (2006.01) |
| *F01K 13/02* | (2006.01) |
| *F01K 15/00* | (2006.01) |
| *F03G 6/00* | (2006.01) |
| *F22B 29/06* | (2006.01) |
| *F22B 35/10* | (2006.01) |
| *F28D 20/00* | (2006.01) |
| *H01M 8/04007* | (2016.01) |
| *H01M 8/04014* | (2016.01) |
| *H01M 8/04029* | (2016.01) |
| *H02J 1/10* | (2006.01) |
| *H02J 3/00* | (2006.01) |
| *H02J 3/04* | (2006.01) |
| *H02M 1/00* | (2006.01) |
| *B63H 11/12* | (2006.01) |
| *B63H 11/14* | (2006.01) |
| *B63H 11/16* | (2006.01) |
| *F01K 11/02* | (2006.01) |
| *F01K 19/04* | (2006.01) |
| *F03D 9/18* | (2016.01) |

(52) U.S. Cl.
CPC ............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search
CPC ..... F01K 19/04; H02M 1/007; H02M 1/0003; H01M 8/04014; H01M 8/0402; H01M 8/04037; H01M 8/04052; H01M 8/04074; H02J 1/102; H02J 3/00; H02J 3/04; F22B 29/06; F22B 35/10; F28D 2020/0004; F28D 20/00; F03D 9/18; B63H 11/12; B63H 11/14; B63H 11/16; B63H 11/00; F03G 6/071; Y02E 60/14

See application file for complete search history.

(56) References Cited

U.S. PATENT DOCUMENTS

| | | | |
|---|---|---|---|
| 3,381,113 A | 4/1968 | Jacques et al. | |
| 3,788,066 A * | 1/1974 | Nebgen | F02C 7/143 |
| | | | 60/39.55 |
| 4,110,987 A | 9/1978 | Cahn et al. | |
| 4,124,061 A | 11/1978 | Mitchell et al. | |
| 4,127,161 A | 11/1978 | Clyne et al. | |
| 4,146,057 A | 3/1979 | Friedman et al. | |
| 4,172,442 A | 10/1979 | Boblitz | |
| 4,222,365 A | 9/1980 | Thomson | |
| 4,234,782 A | 11/1980 | Barabas et al. | |
| 4,438,630 A | 3/1984 | Rowe | |
| 5,154,224 A | 10/1992 | Yasui et al. | |
| 5,286,472 A | 2/1994 | Fulford | |
| 5,384,489 A | 1/1995 | Bellac | |
| 5,416,416 A | 5/1995 | Bisher | |
| 5,553,604 A | 9/1996 | Frei | |
| 7,213,409 B1 | 5/2007 | Nuckols | |
| 7,693,402 B2 | 4/2010 | Hudson et al. | |
| 8,544,275 B2 | 10/2013 | Shinnar | |
| 8,701,773 B2 | 4/2014 | O'Donnell et al. | |
| 8,960,182 B2 | 2/2015 | Magaldi et al. | |
| 9,370,044 B2 | 6/2016 | McDonald | |
| 9,512,826 B2 | 12/2016 | Rodionov et al. | |
| 9,816,490 B2 | 11/2017 | Conlon | |
| 9,948,140 B2 | 4/2018 | Pietsch et al. | |
| 9,989,271 B1 | 6/2018 | Becker | |
| 10,113,535 B2 | 10/2018 | Conlon | |
| 10,345,050 B2 | 7/2019 | Pietsch et al. | |
| 10,775,111 B2 | 9/2020 | Kerth | |
| 10,876,521 B2 | 12/2020 | Anderson et al. | |
| 11,352,951 B2 | 6/2022 | Apte et al. | |
| 11,480,160 B1 * | 10/2022 | Mokheimer | F03G 4/001 |
| 2004/0062063 A1 | 4/2004 | Siri | |
| 2004/0099261 A1 | 5/2004 | Litwin | |
| 2004/0148922 A1* | 8/2004 | Pinkerton | F02C 7/08 |
| | | | 60/670 |
| 2004/0182081 A1 | 9/2004 | Sim et al. | |
| 2006/0174622 A1* | 8/2006 | Skowronski | F02C 6/18 |
| | | | 60/641.8 |
| 2006/0179840 A1 | 8/2006 | Murphy et al. | |
| 2006/0211777 A1 | 9/2006 | Severinsky | |
| 2006/0266039 A1 | 11/2006 | Skowronski et al. | |
| 2008/0000231 A1 | 1/2008 | Litwin et al. | |
| 2008/0066736 A1* | 3/2008 | Zhu | F28D 20/0056 |
| | | | 126/620 |
| 2008/0127647 A1 | 6/2008 | Leitner | |
| 2009/0038668 A1 | 2/2009 | Plaisted | |
| 2009/0090109 A1 | 4/2009 | Mills et al. | |
| 2009/0117633 A1 | 5/2009 | Bradley et al. | |
| 2009/0208402 A1 | 8/2009 | Rossi | |
| 2009/0320828 A1* | 12/2009 | Koketsu | F01K 23/101 |
| | | | 126/585 |
| 2010/0132391 A1 | 6/2010 | Barot | |
| 2010/0178156 A1 | 7/2010 | Rivas Cortes et al. | |
| 2010/0229523 A1 | 9/2010 | Holt et al. | |
| 2010/0251711 A1 | 10/2010 | Howes et al. | |
| 2010/0295306 A1 | 11/2010 | Ridnik et al. | |
| 2011/0226440 A1 | 9/2011 | Bissell et al. | |
| 2011/0286902 A1 | 11/2011 | Fan et al. | |
| 2011/0289924 A1 | 12/2011 | Pietsch | |
| 2012/0102950 A1 | 5/2012 | Turchi | |
| 2012/0131898 A1 | 5/2012 | Mokheimer et al. | |
| 2012/0167559 A1 | 7/2012 | Havel | |
| 2012/0255309 A1 | 10/2012 | Venetos et al. | |
| 2013/0047976 A1 | 2/2013 | Kaftori | |
| 2013/0081394 A1* | 4/2013 | Perry | F01K 7/22 |
| | | | 126/610 |
| 2013/0118169 A1 | 5/2013 | Milam et al. | |
| 2013/0175006 A1 | 7/2013 | Robinson et al. | |
| 2014/0053554 A1 | 2/2014 | Tartibi et al. | |

(56) References Cited

U.S. PATENT DOCUMENTS

| | | | |
|---|---|---|---|
| 2014/0074314 A1 | 3/2014 | Niknafs et al. | |
| 2014/0102073 A1 | 4/2014 | Pang et al. | |
| 2014/0190469 A1 | 7/2014 | O'Donnell et al. | |
| 2014/0216717 A1 | 8/2014 | O'Donnell et al. | |
| 2014/0223906 A1 | 8/2014 | Gee et al. | |
| 2014/0224469 A1 | 8/2014 | Mirmobin et al. | |
| 2014/0366536 A1 | 12/2014 | Muren | |
| 2015/0033740 A1 | 2/2015 | Anderson et al. | |
| 2015/0053266 A1 | 2/2015 | Chen et al. | |
| 2015/0143806 A1 | 5/2015 | Friesth | |
| 2015/0224850 A1* | 8/2015 | Bank | B60H 1/00507 |
| | | | 392/340 |
| 2015/0276234 A1 | 10/2015 | Muro et al. | |
| 2015/0354545 A1 | 12/2015 | Conlon | |
| 2016/0130709 A1 | 5/2016 | Hong et al. | |
| 2016/0146110 A1 | 5/2016 | Hackstein et al. | |
| 2016/0164451 A1 | 6/2016 | Lenert et al. | |
| 2016/0208657 A1 | 7/2016 | Brückner et al. | |
| 2016/0214910 A1 | 7/2016 | King | |
| 2017/0051949 A1 | 2/2017 | Uselton | |
| 2017/0093163 A1 | 3/2017 | Johnson et al. | |
| 2017/0204741 A1 | 7/2017 | Hogen et al. | |
| 2017/0241669 A1 | 8/2017 | von Behrens | |
| 2017/0283713 A1 | 10/2017 | Stephens et al. | |
| 2017/0362090 A1 | 12/2017 | Melsert et al. | |
| 2018/0003445 A1 | 1/2018 | Bergan et al. | |
| 2018/0028967 A1 | 2/2018 | Balfe et al. | |
| 2018/0038352 A1* | 2/2018 | Conlon | F01K 23/18 |
| 2018/0073777 A1 | 3/2018 | O'Donnell et al. | |
| 2018/0083449 A1 | 3/2018 | Green | |
| 2018/0163574 A1 | 6/2018 | Bailey et al. | |
| 2018/0179955 A1 | 6/2018 | Apte et al. | |
| 2018/0207557 A1 | 7/2018 | Nellis | |
| 2018/0216010 A1 | 8/2018 | Hong | |
| 2018/0231316 A1 | 8/2018 | Watremetz et al. | |
| 2018/0245485 A1 | 8/2018 | Conlon | |
| 2018/0292097 A1 | 10/2018 | Specter | |
| 2018/0347406 A1 | 12/2018 | Friesth | |
| 2018/0372420 A1 | 12/2018 | Ahadi et al. | |
| 2019/0003308 A1 | 1/2019 | Laughlin | |
| 2019/0043624 A1 | 2/2019 | Fork et al. | |
| 2019/0045617 A1 | 2/2019 | Fork et al. | |
| 2019/0162482 A1* | 5/2019 | Kerth | F28C 3/14 |
| 2019/0226462 A1 | 7/2019 | Conlon | |
| 2019/0331098 A1 | 10/2019 | von Behrens et al. | |
| 2019/0359894 A1 | 11/2019 | Heidel et al. | |
| 2020/0172815 A1 | 6/2020 | Stephens et al. | |
| 2020/0232345 A1 | 7/2020 | Zwinkels | |
| 2020/0332201 A1 | 10/2020 | Koseoglu et al. | |
| 2020/0346165 A1 | 11/2020 | Lu et al. | |
| 2020/0386447 A1 | 12/2020 | Wang | |
| 2021/0094834 A1 | 4/2021 | Chen et al. | |
| 2021/0143446 A1 | 5/2021 | Ponec et al. | |
| 2021/0172685 A1 | 6/2021 | Bergan et al. | |
| 2021/0190044 A1 | 6/2021 | Anderson et al. | |
| 2021/0207527 A1 | 7/2021 | Robinson | |
| 2021/0328544 A1 | 10/2021 | Johnson et al. | |
| 2022/0049615 A1 | 2/2022 | Truong | |
| 2022/0060142 A1 | 2/2022 | Akhavan-Tafti | |
| 2022/0085603 A1 | 3/2022 | McNamara et al. | |
| 2022/0090827 A1 | 3/2022 | Magaldi et al. | |
| 2022/0132633 A1 | 4/2022 | Forsberg et al. | |
| 2022/0146205 A1 | 5/2022 | Eronen et al. | |
| 2022/0228271 A1 | 7/2022 | Ashok et al. | |
| 2022/0228772 A1 | 7/2022 | Murata et al. | |

FOREIGN PATENT DOCUMENTS

| | | | |
|---|---|---|---|
| CN | 1559893 A | 1/2005 | |
| CN | 101592439 B | 4/2011 | |
| CN | 105605957 A | 5/2016 | |
| CN | 105948037 A | 9/2016 | |
| CN | 107246732 A | 10/2017 | |
| CN | 107872196 A | 4/2018 | |
| CN | 108204760 A | 6/2018 | |
| CN | 108362151 A | 8/2018 | |
| CN | 108612634 A | * 10/2018 | |
| CN | 111256364 A | 6/2020 | |
| CN | 210802160 U | 6/2020 | |
| CN | 111655989 A | 9/2020 | |
| CN | 212157096 U | 12/2020 | |
| DE | 19808810 C1 | 6/1999 | |
| DE | 102009020531 B3 | 4/2011 | |
| DE | 102017212684 A1 | 1/2019 | |
| EP | 794161 B1 | 7/1996 | |
| EP | 1930587 A2 | 6/2008 | |
| EP | 2372116 A1 | 10/2011 | |
| EP | 2722496 A2 | 4/2014 | |
| EP | 3081770 A1 | 10/2016 | |
| EP | 3081770 A1 * | 10/2016 | |
| EP | 3324018 A1 | 5/2018 | |
| EP | 3486594 A1 | 5/2019 | |
| EP | 2837086 B1 | 11/2019 | |
| EP | 3245388 B1 | 11/2019 | |
| EP | 3725917 A1 | 10/2020 | |
| EP | 2909547 B1 | 9/2021 | |
| EP | 3642296 A1 | 1/2022 | |
| GB | 2109026 A | 5/1983 | |
| GB | 2477801 A | 8/2011 | |
| IL | 284451 | 8/2021 | |
| JP | 2006145200 A | 6/2006 | |
| KR | 2001-0100320 A | 11/2001 | |
| KR | 102308531 B1 | 10/2021 | |
| MA | 40029 A | 12/2015 | |
| TW | 202100240 A | 1/2021 | |
| WO | WO 1980/000170 | 2/1980 | |
| WO | WO 2007/108014 A1 | 9/2007 | |
| WO | WO 2008/052249 A1 | 5/2008 | |
| WO | WO 2008/108870 A1 | 9/2008 | |
| WO | WO 2009/152562 A1 | 12/2009 | |
| WO | WO 2011/077248 A2 | 6/2011 | |
| WO | WO 2011/109514 A1 | 9/2011 | |
| WO | WO 2012/123853 A1 | 9/2012 | |
| WO | WO 2012/127178 A1 | 9/2012 | |
| WO | WO 2012/150969 A1 | 11/2012 | |
| WO | WO 2013/020176 A1 | 2/2013 | |
| WO | WO 2014/063191 A1 | 5/2014 | |
| WO | WO 2014/151843 A2 | 9/2014 | |
| WO | WO 2015/149124 A1 | 10/2015 | |
| WO | WO 2015/187423 A2 | 12/2015 | |
| WO | WO 2016/065191 A1 | 4/2016 | |
| WO | WO 2016/150455 A1 | 9/2016 | |
| WO | WO 2017/049320 A1 | 3/2017 | |
| WO | WO 2017/147022 A1 | 8/2017 | |
| WO | WO 2018/011363 A1 | 1/2018 | |
| WO | WO 2018/101989 A1 | 6/2018 | |
| WO | WO 2019/020562 A1 | 1/2019 | |
| WO | WO 2019/149623 A1 | 8/2019 | |
| WO | WO 2019/224538 A1 | 11/2019 | |
| WO | WO 2020/068758 A1 | 4/2020 | |
| WO | WO 2020/254001 A1 | 12/2020 | |
| WO | WO 2022/086630 A1 | 4/2022 | |
| WO | 2022/187903 A1 | 9/2022 | |
| ZA | 201603514 B | 11/2018 | |

OTHER PUBLICATIONS

English Translation CN-108612634-A (Year: 2016).*

"Ethylene Production via Cracking of Ethane-Propane", Chemical Engineering, Nov. 1, 2015, Total pp. 4.

"Matching Time of Use Periods With Grid Conditions Maximizes Use of Renewable Resources", California ISO, Outcropping Way, Folsom, 2015, Total pp. 2.

"Miscibility Gap Alloys", University of Newcastle, accessed at https://miscibilitygapalloy.blogspot.com/p/how-did-it-stater-ted.html on Apr. 2, 2022.

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.

Alexis Mckittrick, "Low Temperature & Coproduced Resources Reservoir Thermal Energy Storage (RTES) Portfolio", Geothermal Technologies Office, U.S. Department of Energy, Total pp. 4.

(56) References Cited

OTHER PUBLICATIONS

Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.
Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.
Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.
Bao Truong, "Malta Pumped Heat Energy Storage System Green Heat & Power Application", Energy Storage for Manufacturing and Industrial Decarbonization Workshop, Feb. 9, 2022, Total pp. 5.
Ben Bollinger, "Malta Pumped Heat Energy Storage", Malta, Aug. 10, 2021, Total pp. 9.
Cédric Philibert, "Renewable Energy for Industry", Renewable Energy Division, International Energy Agency, Nordic Pavillion, COP23, Fidji-Bonn, Nov. 15, 2017, Total pp. 7.
Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.
Charles Forsberg et al., "Variable Electricity from Base-load Nuclear Power Plants Using Stored Heat", International Congress on Advances in Nuclear Power Plants (ICAPP 2015), May 2015, Total pp. 12.
Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.
Charles Forsberg, "Hybrid systems to address seasonal mismatches between electricity production and demand in nuclear renewable electrical grids", Energy Policy, vol. 62, Nov. 2013, pp. 333-341, Total pp. 9.
Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.
Christopher Fraughton, "Electro-Thermal Energy Storage General Presentation", MAN Energy Solutions, Aug. 2021, Total pp. 23.
CK-12 Foundation, "Saturated Hydrocarbon", Apr. 2, 2022, Total pp. 8.
Clifford K. Ho, "High-Temperature Thermal Storage in Moving and Fixed Particle Beds", Thermal-Mechanical-Chemical Energy Storage (TMCES) Workshop, San Antonio, TX, Total pp. 13.
Cowper Stove an overview ScienceDirect Topics, Sep. 13, 2021, Total pp. 25.
D. Fernandes et al., "Thermal energy storage: How previous findings determine current research priorities", Energy, vol. 39, Issue 1, Mar. 2012, pp. 246-257, Total pp. 12.
Daniel C Stack et al., "Performance of firebrick resistance-heated energy storage for industrial heat applications and round-trip electricity storage", Applied Energy, vol. 242, May 15, 2019, pp. 782-796, Total pp. 15.
Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.
Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.
Daniel Stack et al., "Joule Hive-Replacing fire with renewable heat", Total pp. 15.
David Bierman, "Clean, affordable, and reliable heat & electricity", Antora Energy, Total pp. 9.
David L. Chandler "Mit News: Turning desalination waste into a useful resource" MIT News Office, Feb. 13, 2019 (Cited in NFOA dated Sep. 14, 2022 in related U.S. Appl. No. 17/650,522.).
David Roberts, "Solar power's greatest challenge was discovered 10 years ago. It looks like a duck", www.vox.com, Aug. 29, 2018, Total pp. 19.
Dr. Avi Shultz, "Concentrating Solar-thermal Power and Thermal Energy Storage", U.S. Department of Energy, Total pp. 7.
Dr. Avi Shultz, "Industrial Decarbonization:Renewable Process Heating from Concentrating Solar Thermal", U.S. Department of Energy, Total pp. 6.
Dr. Eric L. Miller, "The Hydrogen Energy Earthshot and H2@Scale: Importance to Industrial Decarbonization", Energy StorM Panel, Feb. 8, 2022, Total pp. 9.
Dr. Gianluca Ambrosetti et al., "Cement Production", Energy Storage for Manufacturing and Industrial Decarbonization Workshop "Energy StorM", Feb. 8, 2022, Total pp. 10.
Echogen, "CO2-Based Pumped-Thermal Energy Storage Technical Overview & Status", Echogen Power System, Total pp. 20.
Elizabeth Endler, "Energy Storage for Manufacturing Petrochemical Industry Perspective", Feb. 8, 2022, "Energy StorM" Workshop, US Department of Energy, Total pp. 14.
Elliott Group, "Materials for Hydrogen Compression", Thermo-Mechanical-Chemical Energy Storage Workshop, Elliott, Aug. 10-11, 2021, Total pp. 25.
Emiliano Bellini, "Long-duration thermal storage system based on silica sand", pv magazine International, Nov. 5, 2021, Total pp. 6.
Emiliano Bellini, "Storing wind, solar power with silica sands", pv magazine International, Sep. 1, 2021, Total pp. 10.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total pp. 67.
Haisheng Chen et al., "Progress in electrical energy storage system: A critical review", Progress in Natural Science, vol. 19, Issue 3, Mar. 10, 2009, pp. 291-312, Total pp. 22.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Hélder Da Silva, "Energy Storage for Manufacturing and Industrial Decarbonization Workshop "Energy StorM"", Feb. 8, 2022, Total pp. 11.
Hitesh Bindra et al., "Sliding flow method for exergetically efficient packed bed thermal storage", Applied Thermal Engineering, vol. 64, Issues 1-2, Mar. 2014, pp. 201-208, Total pp. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.
Ilievski D, "New Two-Stage Calcination Technology", Proceedings of the 9th International Alumina Quality Workshop, Alcoa World Alumina, Technology Delivery Group, Western Australia, 2012, Total pp. 7.
Industrial Decarbonization using Electric Thermal Energy Storage (ETES), Jan. 25, 2022, Total pp. 11.
International Search Report dated Sep. 14, 2022 for International Application No. PCT/US2021/061041, 41 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Jeff Moore, "Oxygen Storage Incorporated into the Allam OxyFuel Power Cycle", Southwest Research Institute, Total pp. 8.
Joe Cresko, "Energy Storage for Manufacturing", Energy Storage for Manufacturing & Industrial Decarbonization Workshop, Feb. 8-9, 2022, Total pp. 11.

(56) References Cited

OTHER PUBLICATIONS

Joe Paladino, "Transformation of the Electric Grid", Energy StorM Workshop, Feb. 4, 2022, Total pp. 5.
Joe Stekli, "pp. Update TMCES 2021", Low-Carbon Resources Initiative, Electric Power Research Institute, Aug. 2021, Total pp. 31.
Joshua Schmitt, "Development of an Advanced Hydrogen Energy Storage System Using Aerogel in a Cryogenic Flux Capacitor (CFC)", Southwest Research Institute, Total pp. 8.
Lion Hirth, "The market value of variable renewables: The effect of solar wind power variability on their relative price", Energy Economics, vol. 38, Jul. 2013, pp. 218-236, Total pp. 19.
Lion Hirth, "The Optimal Share of Variable Renewables: How the Variability of Wind and Solar Power affects their Welfare-optimal Deployment", The Energy Journal, vol. 36, No. 1, p. 149-184, Total pp. 36.
Lori Schaefer-Weaton, "Solar & Battery Energy Solution Agri-Industrial Plastics Co.", Agri-Industrial Plastics Company, Total pp. 12.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2019, Total pp. 7.
Marc Medrano et al., "State of the art on high-temperature thermal energy storage for power generation. Part 2-Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.
Michael Pesin, "The Office of Electricity Grid Modernization R&D Portfolio", Aug. 2, 2021, Total pp. 18.
Mike Gravely, "The Role of Energy Storage in Helping California Meet the State's Future Zero Carbon Energy Goals", Energy Research and Development Division, California, Total pp. 23.
Natalie Smith et al., "Integration of Pumped Heat Energy Storage with a Fossil-Fired Power Plant", U.S. Department of Energy, Total pp. 6.
PCT; Invitation to Pay Additional Fees issued in International Patent Application No. PCT/US2021/061041; dated Mar. 24, 2022; 21 Pages.
Pintail Power LLC, "Liquid Air Combined Cycle Hybrid Energy Storage", Pintail Power LLC, TMCES Workshop, Aug. 10-11, 2021, San Antonio, TX, Total pp. 12.
Office Action in U.S. Appl. No. 17/650,519 dated Apr. 20, 2022, 10 pages.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.
Russ Weed, "Market Needs & Technology Overview", Thermal-Mechanical-Chemical Energy Storage Workshop -Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Scott Hume, "Mid-Duration Energy Storage (MDES) Benefits and Challenges", 3rd TMCES Workshop, Aug. 10, 10 2021, Total pp. 11.
Sempra Energy Utility, "SoCalGas", Total pp. 6.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens AG, "Compressed Air Energy Storage (CAES)", 3rd Thermal-Mechanical-Chemical Energy Storage Workshop, Siemens Energy, Aug. 2021, Total pp. 17.
Siemens Gamesa, "Electric Thermal Energy Storage (ETES)—Industrial Decarbonization", Siemens Gamesa Renewable Energy, Total pp. 9.
Soteris Kalogirou, "The potential of solar industrial process heat applications", Applied Energy, vol. 76, Issue 4, Dec. 2003, pp. 337-361, Total pp. 25.
Steffes, ThermElect Hydronic, Demand-Free, Off-Peak Heating, Total pp. 2.
Stefica Nicol Bikes, "Australian engineers patent thermal block to store renewable energy", www.reuters.com, Oct. 27, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require A High Steam Quality", Steam Systems Best Practices, Document No. 23, 2009, Total pp. 3.
T. Fiedler et al., "Thermal capacitors made from Miscibility Gap Alloys (MGAs)", WIT Transactions on Ecology and The Environment, vol. 186, 2014, Total pp. 8.
Thomas A. Buscheck, "Hybrid-energy technology enabled by heat storage and oxy-combustion for power and industrial-heat applications with near-zero or negative CO2 emissions", Thermal-Mechanical-Chemical Energy Storage Workshop, San Antonio, Texas, Total pp. 22.
Timothy C. Allison, "Thermal-Mechanical-Chemical Energy Storage Technology Overview and Research Activities", Southwest Research Institute, Aug. 9, 2021, Total pp. 22.
Todd Brix, "Converting Carbon. Storing Energy", Richland, Washington U.S.A, Total pp. 13.
Tony Bowdery et al., "Heat Exchangers For Thermal Energy Storage: Challenges and Mitigation", Meggitt, Aug. 2021, Total pp. 20.
Torbjörn Lindquist, "Powering the evolution of a renewable society, by redefining energy infrastructure", Azelio, Total pp. 10.
Travis McLing et al., "Dynamic Earth Energy Storage: Grid Scale Energy Storage using Planet Earth as a Thermal Battery (RTES)", Total pp. 7.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Vishal Sardeshpande, "Performance analysis for glass furnace regenerator", Applied Energy, vol. 88, Issue 12, Dec. 2011, pp. 4451-4458, Total pp. 8.
Whitlock, "pp. scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority dated Sep. 14, 2022 for PCT/US2021/061041, 25 pages.
Dr. Jeffrey Goldmeer, "Power To Gas: Hydrogen for Power Generation Fuel Flexible Gas Turbines as Enablers for a Low or Reduced Carbon Energy Ecosystem," GE Power, Feb. 2019, 19 pages.

(56) References Cited

OTHER PUBLICATIONS

GE Energy Storage Unit RSU-4000, Modular, Scalable Energy Storage Solution for Utility-Scale Applications; www/ge.com/energystorage; 2020, 1 page.

Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Received Dec. 14, 2019; Accepted Mar. 4, 2020; 20 pages.

How thermal power plants can benefit from the energy transition, The Future of Energy 2019, Siemens Gamesa Renewable Energy, 10 pages.

Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.

\* cited by examiner

MOVE WHR ELECTRICITY TO HIGHEST VALUE OR DEMAND TIMES

THERMAL ENERGY STORAGE SYSTEM COUPLED WITH THERMAL POWER CYCLE SYSTEMS

CROSS-REFERENCE TO RELATED APPLICATIONS

The present application is a continuation-in-part of U.S. patent application Ser. No. 17/668,333, filed Feb. 9, 2022[1]. This application also claims priority under 35 USC § 119(e) to:

[1] ... which is a continuation of U.S. Pat. No. 11,603,776, granted on Mar. 14, 2023 and filed Nov. 29, 2021, which claims benefit under 35 USC § 119(e) to U.S. Provisional Application No. 63/119,443, filed on Nov. 30, 2020, U.S. Provisional Application No. 63/155,261, filed on Mar. 1, 2021, U.S. Provisional Application No. 63/165,632, filed on Mar. 24, 2021, U.S. Provisional Application No. 63/170,370, filed on Apr. 2, 2021, and U.S. Provisional Application No. 63/231,155, filed on Aug. 9, 2021, as well as under 35 USC § 120 and § 365 to PCT/US2021/06141, filed Nov. 29, 2021.

U.S. Provisional Patent Application No. 63/337,562 filed on May 2, 2022,
U.S. Provisional Patent Application No. 63/338,805 filed on May 5, 2022,
U.S. Provisional Patent Application No. 63/347,987 filed on Jun. 1, 2022,
U.S. Provisional Patent Application No. 63/378,355 filed on Oct. 4, 2022,
U.S. Provisional Patent Application No. 63/427,374 filed on Nov. 22, 2022, and
U.S. Provisional Patent Application No. 63/434,919 filed on Dec. 22, 2022.

The contents of these priority applications are incorporated by reference in their entirety and for all purposes.

BACKGROUND

Technical Field

The present disclosure relates to thermal energy storage and utilization systems. More particularly, the present disclosure relates to an energy storage system that stores electrical energy in the form of thermal energy, which can be used for the continuous supply of hot air, carbon dioxide ($CO_2$), steam or other heated fluids, for various applications including the supply of heat for power generation. More specifically, the energy storage system provides higher-temperature heat to a conventional lower-temperature working fluid heated by a conventional heat source, to boost the temperature of the working fluid to a generator of a power cycle system, thereby increasing the efficiency of the power cycle. New disclosure in this application (beyond what was disclosed in the parent application Ser. No. 17/668,333) appears primarily at paragraphs 34-60 and 218-312, and in FIGS. 8-19.

RELATED ART

I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy—different heating processes or industrial processes-require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important, and may be a higher determinant of total system cost than the discharge rate.

C. Thermal Energy Storage Problems and Disadvantages

The above-described approaches have various problems and disadvantages. Earlier systems do not take in to account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a need to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Conventional Thermal Power Generation (TPG)

A. TPG Thermodynamic Concepts

Energy in the form of low- to medium-temperature heat (for example, above 40° C. and below 400° C.) may be extracted from many sources, including geothermal reservoirs and geologic formations that have been heated by the injection of steam or other hot fluids. Heat may also be recovered from combustion and other processes, waste product streams, exhaust gas streams, and other sources. Such sources may provide low to medium-temperature heat without fuel consumption at very low cost, other than the capital costs of heat extraction equipment such as heat exchangers and pumps. In some embodiments, heat is converted to economic value is by driving a thermal power generation cycle, and converting a portion of the captured heat to electric power. In some embodiments, the power generation cycle can deliver relatively continuous ("baseload") power, without the combustion of fuels. As is well known, the efficiency of conversion to work is a function of the temperature of the heat source.

In a conventional Rankine cycle, a boiler heats a working fluid at an elevated pressure to a high-pressure gas, such as steam when the working fluid is water. The high-pressure steam drives a turbine, generating electricity for an industrial use, such as powering an electrical grid. After passing through the turbine, the working fluid (e.g., steam) is now at a lower pressure and temperature, and may be passed through a condenser, which absorbs heat from the steam, condensing it back into the liquid phase, whereupon the liquid working fluid (e.g. liquid water) is pumped back to the boiler to repeat the cycle.

Conventionally, heat extracted from the expanded steam by the condenser may be exhausted into the atmosphere as waste heat in air-cooled condensers, or may be exchanged to some other fluid coolant in water-cooled condensers. In some applications, where both heat (e.g. steam) and power are desired by a facility, the condenser stage may be removed from the process. Instead of being condensed, the expanded steam is used in a heating application. This is generally known as cogeneration. The water (in the form of steam) sent to the facility is either recirculated to the power cycle and/or is replaced by make-up water.

The Brayton Cycle, which is a well-known thermodynamic cycle that describes the operation of heat engines that use a gas as the working fluid, resembles the Rankine Cycle in the function of the four stages. A gaseous working fluid is pressurized in a compressor, and then brought to a higher temperature. The heat addition may be done either indirectly (e.g. by a heat exchanger) or directly (e.g. burning fuel and injecting the hot exhaust into the cycle). The high-temperature, high-pressure gas is then expanded across a turbine. The pressure difference across the turbine generates mechanical work, which is transformed into electricity in a generator. The expanded gas having a lower pressure and temperature may be cooled in a heat exchanger and may be released to the environment, or returned to the input of the power cycle. The ideal Brayton cycle operates on the principle that the heat addition and rejection stages be at constant pressures.

In some applications, the Brayton Cycle and Rankine Cycle are combined in a so-called combined cycle as a Brayton power cycle (e.g. gas turbine) operating at a higher temperature than the Rankine cycle. In such typical use, the temperature of the Brayton cycle turbine's outlet gas is at a higher temperature than the Rankine Cycle's turbine inlet temperature. The Brayton turbine outlet rejects heat by heating the working fluid of the Rankine Cycle, capturing all or a portion of the Brayton cycle output heat and providing all or a portion of the Rankine Cycle inlet heat.

The Brayton Cycle or Rankine Cycle may also operate with a working fluid that is supercritical such as supercritical $CO_2$ Brayton Cycle or supercritical steam Rankine Cycle. A fluid is supercritical when its temperature and pressure are above the fluid's critical point. In this state, distinct gas and liquid phases do not exist. A supercritical fluid has unique properties between those of a gas and liquid that make it attractive in thermal power generation cycles. A supercritical fluid after expansion in a turbine is at a lower temperature and pressure where the fluid density resembles that of a liquid. Once heated, the density will drop to resemble that of a gas, allowing more energy to be extracted in the turbine. This thermodynamic feature increases the efficiency of a thermal power cycle.

While low to medium temperature heat may be low in cost, the amount of electric power which can be extracted may be low. In thermal power cycles, the thermal efficiency of conversion from heat to useful work is bounded by the Carnot Cycle efficiency, the theoretical ideal thermodynamic cycle, which depends on the equation:

$$\eta = \frac{T_1 - T_2}{T_1}$$

where:

$\eta$ is the thermal efficiency;

T1 is the absolute temperature of the heat source (e.g., temperature of the flue gas stream exchanging heat); and T2 is the absolute temperature of the heat rejection sink (condenser temperature or ambient environment).

T2 is generally fixed due to the temperature constraint of available heat sinks (often ambient air or liquid water). A thermal power cycle operating with a higher inlet temperature can convert a higher fraction of the thermal energy to work or electric power. In other words, increasing the temperature of the working fluid before entering the expansion section of a thermal power generation cycle is important in ensuring an efficient power generation cycle.

B. Geothermal Power Generation

In geothermal power plant applications, heat is extracted from geologic formations. The low- to medium-temperature heat extracted from such applications limits the efficiency of a thermal power cycle to a level below the efficiency of a higher-temperature process such as one powered by natural gas or coal. The relatively low temperature constrains the overall economics of such power plants, as equipment must handle large heat flows for limited power output.

Geothermal power plants commonly have another problem with their efficient operation. Over the life of the plant, the flow and temperature characteristics of the geothermal fluid may change, commonly dropping both in flow rate and in temperature versus original conditions. A generating facility may be forced to operate at only a fraction of its design power output. Furthermore, a thermal power cycle designed for a higher operating temperature may not operate correctly, or may experience damage, if supplied with heat at a lower temperature; a common example is the erosion of steam turbine blades by inadequately superheated steam partially condensing during its passage through the turbine.

C. Waste Heat Recovery

In industrial or power generation processes using heat, there is a demand for capturing the low-grade waste heat that exits the plant as flue gas or exhaust before or after exchange with an existing cooler, condenser, or heat exchanger if present in a process. The high-temperature exhaust from a furnace, boiler, or process unit such as a reactor may be passed through a series of heat exchangers or otherwise arranged to capture medium- to high-temperature heat that can be used elsewhere in the plant (e.g. to preheat combustion air, fuel, or a material stream such as water). In other applications, the waste heat stream contains enough high-quality (high-temperature) heat to generate steam at high enough pressures and temperatures to warrant the use of a thermal power generation cycle to extract electric power from the waste heat.

Often a combination of the aforementioned heat recovery methods is utilized in the same plant. The effectiveness of the thermal power generation cycle to convert the recovered waste heat to electricity is related to the Rankine efficiency. In general, the Rankine efficiency increases with higher working fluid (conventionally steam) temperature. The result of this is that only a small fraction of the waste heat available is captured and turned into power. The non-recovered low-grade heat is rejected to the environment or to another use of low-temperature heat.

There are several practical constraints that may vary on a plant-to-plant basis in terms of how much heat can be recovered. A consistent lower constraint to using steam generation as a means of capturing heat is the boiling point of water, which at atmospheric conditions is 100° C. At higher pressures, the boiling point increases significantly. If a steam stream is to be expanded across an expansion device (such as a turbine), the pressure difference across the turbine is transformed into useful energy (such as electricity or mechanical work). However, only a fraction of the available energy input to the expansion stage (i.e. the turbine) of the thermal power generation cycle is converted into useful energy, with a significant portion of the unused heat being released to the environment. This is referred to as "waste heat".

Water has a high specific heat capacity, meaning that it must release a lot of heat in order to lower temperature. Water also has a very high latent heat of vaporization, meaning that a lot of energy can be captured if the water vapor in the flue gas is condensed to liquid. This involves cooling the exhaust stream to below the dew point.

The dew point is the temperature in which air (or gaseous exhaust) is saturated with water vapor. Water vapor begins to condense out of the gas as it is cooled below the dew point. Often flue gas condensation is implemented in thermal systems with low return temperatures below approximately 55° C.—although the temperature will vary with ambient conditions and flue gas characteristics. The Second Law of Thermodynamics states that heat transfer occurs spontaneously from higher to lower temperature bodies, but never spontaneously in the reverse direction.

It is for this reason that cooling flue exhaust temperatures to this point can be difficult. Often there is not much use for heat extracted below the boiling point of water. It may be used for a feedwater preheating before steam generation along with a hotter portion of the stream, but often a good deal of the extractable energy is not able to be reused.

D. Organic Fluid in Thermal Power Generation Cycle

The thermodynamic properties of water act as a limitation on the range of efficient operating temperatures of the thermal power generation cycle. This problem has inspired the use of an Organic Rankine Cycle (ORC), a Kalina cycle, and/or other approaches using an alternate fluid with a different boiling point than pure water. By using a thermal power generation cycle with a different working fluid, the range of possible work to be extracted from a waste heat stream at a specific set of temperatures may be improved. The process is similar to conventional steam generation waste heat recovery. The exhaust/flue stream passes through a heat exchanging system to transfer heat to the alternate working fluid (instead of water-steam), in order to cause phase change from liquid to vapor.

The generated vapor is then put through the traditional stages of the thermal power generation cycle. It moves through an expansion device (such as a turbine) to generate power before being passed through a condenser where the working fluid is re-condensed. At this point, the flue gas can be released to the environment at a temperature that is closer to the ambient temperature of the environment, reducing lost heat. This is especially useful in applications where post-combustion carbon capture is used to capture flue gas emissions from a process. The flue temperature often must be cooled below 50-70° C. before entering the amine absorber. The result of this is that a large amount of heat is rejected in cooling the flue gas to temperatures that are acceptable to the carbon capture system. An ORC allows this rejected heat to be used for power generation, which is attractive because it can aid in supplying the power demand of the capture process.

However, there are several issues associated with ORCs and traditional steam thermal power generation cycles, especially in waste heat recovery applications. In the thermal power generation cycle, the thermal efficiency of conversion from heat to useful work depends on the above-discussed equation. The efficiency of the thermal power generation cycle may be improved by increasing the temperature of the heat source. In other words, increasing the temperature of the working fluid before entering the expansion section of the cycle is important to ensure an efficient power generation cycle. This increase can be accomplished by superheating the stream or increasing cycle pressure.

In waste heat recovery applications for steam generation or organic working fluid vaporizing (in an ORC), the waste heat source temperature is limited to what is available in the exiting flue stream. Often these cycles see lower efficiencies due to lower turbine inlet temperatures and lower degrees of superheating. Combining recovered waste heat with higher-temperature heat can be used to increase the Rankine efficiency as discussed before, and leads to improved plant performance. Adding temperature to a steam flow (super-heating) can prevent the expanded steam from condensing within the expansion equipment, improving equipment lifetime and allowing more useful work to be extracted from the steam. However, higher heat source temperatures are required to superheat steam.

Organic Rankine cycles are generally designed to operate at lower temperatures than steam thermal power generation cycles. The heat sink/heat source temperature difference is typically low, leading to low thermal efficiencies generally ranging from 9 to 18%, as opposed to approximately 25-40% for steam thermal power generation cycles.

E. Biomass Steam Boiler Turbines

Conventional biomass steam boilers have various challenges. For example, biomass is a highly variable low-quality solid fuel with several environmental and physical constraints that limit the operating conditions of the combustion. Some of those constraints include high moisture and/or low heating value, meaning that less heat can be generated per unit mass, and low adiabatic flame temperatures limit the maximum temperature of a combustion; large amounts of nitrogen and sulfur, which produce NOx emissions above a certain temperature and air-fuel ratio, further limiting the useful temperature range; and high amounts of ash, which corrodes the boiler lining and adds another degree of constraint around the combustion. The result is low steam turbine efficiency.

SUMMARY

The example implementations advance the art of thermal energy storage and enable the practical construction and operation of high-temperature thermal energy storage systems which are charged by VRE, store energy in solid media, and deliver high-temperature heat.

I. Thermal Energy Storage System

This Section I of the Summary relates to the disclosure as it appears in U.S. patent application Ser. No. 17/668,333, of which this application is a continuation-in-part.

Aspects of the example implementations relate to a system for thermal energy storage, including an input, (e.g., electricity from a variable renewable electricity (VRE) source), a container having sides, a roof and a lower platform, a plurality of vertically oriented thermal storage units (TSUs), inside the container, the TSUs each including a plurality of stacks of bricks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen and other gases, alone or in combination), and when one is mentioned it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g. to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

II. TPG System and Applications

This Section II of the Summary relates to the newly added disclosure of this continuation-in-part application.

An inventive system and process includes a thermal energy storage (TES) system that captures and stores intermittent electrical energy by converting it to high-temperature heat stored in a medium, and discharges high temperature heat externally to a thermal power generation cycle. A lower-temperature heat source, which may be geothermal heat, heat stored in subsurface formations, or heat recovered from an exhaust or waste heat source, generates a working fluid which is subsequently further heated by the high-temperature heat of the thermal energy storage system. The superheated working fluid is provided to a turbine, which converts the superheated working fluid into power to generate electricity.

According to one aspect, in a thermal power generation cycle system that receives as input heat from a temperature-constrained source (such as a biomass steam boiler, a geothermal power plant, or waste heat recovery power cycles), a system for enhancing the efficiency of available heat usage, including the combination of:

a thermal energy storage (TES) system that receives renewable energy in the form of electricity and converts that energy into heat, which is used to heat a thermal storage medium such as a refractory material, carbon or a liquid; an energy movement means that controls the extraction of heat from the TES, e.g. by pumps, louvers, shutters or other moving apparatus controlling the flow of a liquid or the propagation of thermal radiation; and a heat exchanger that delivers heat therefrom to a Rankine working fluid, which may be an organic Rankine working fluid, prior to that fluid being provided to a turbine, thus superheating the working fluid and/or raising the turbine inlet pressure of the working fluid to increase Rankine efficiency and improve plant performance.

In another aspect, a TES system may be interconnected with a geothermal, biomass, or waste heat recovery (WHR) steam or ORC system so as to supply an additional flow of steam or other working fluid which is combined with the steam or working fluid heat flow from the geothermal, biomass, or WHR heat flow, either on a continuous basis or on selective basis, so as to continuously or selectively increase the power generated from the associated turbine.

In another aspect, a thermal power generation cycle system is provided that receives as input heat from a geothermal fluid, a system for enhancing the efficiency of usage of that input heat, including the combination of: a thermal energy storage (TES) system that receives renewable energy in the form of electricity and converts that energy into heat, which is used to heat a thermal storage medium such as a refractory material; an air movement system that moves air through the TES to extract the stored heat from the refractory material and discharge hot air; one or both of the following heat exchangers:

a heat exchanger that receives the geothermal fluid and provides heat from the discharged hot air to further heat the geothermal fluid before providing it: (a) to a flash tank separator (in the case of a liquid flash process), or (b) directly into the Rankine fluid flow path; or (c) to a primary heat exchanger for the Rankine system; and a heat exchanger that provides heat from the TES to a Rankine working fluid, which may be an organic Rankine working fluid, prior to that fluid being provided to a turbine, thus superheating the working fluid and/or raising the turbine inlet pressure of the working fluid to increase Rankine efficiency and improve plant performance.

If the power cycle system has an existing steam turbine or ORC, increasing the temperature and/or pressure of the working fluid will result in some increased efficiency. More efficiency increase due to the TES heat integration may be achieved by providing a second "topping" turbine upstream of the existing steam turbine, the additional turbine first receiving the highest-temperature working fluid stream heated by the TES and delivering the heat in its discharge stream at a lower temperature directly or via a heat exchanger into the existing steam turbine or ORC. For example, if an existing waste heat recovery Rankine cycle includes a turbine designed for inlet working fluid conditions at a first temperature and pressure, generated in a heat exchanger or heat recovery steam generator (either referred to as an HRSG), such a system can be retrofitted with TES heat integration as follows. In one implementation, the fluid flowing from the existing HRSG would preheat pressurized an inlet water stream to the TES steam generator. The TES steam generator would deliver steam of higher pressure and temperature than the conditions of the existing turbine, which would flow through the higher-pressure "topping" turbine. Outlet flow from the topping turbine would either flow through the existing turbine or through a heat exchanger which heats the inlet fluid flow to the existing turbine. In another implementation, the existing heat source would be configured to deliver steam at a first pressure and temperature which is combined with higher-pressure, higher-temperature steam from the TES through a thermal vapor compressor ("steam jet"), by which a higher-pressure steam flow entrains a lower-pressure flow and creates a combined mass flow of steam at a pressure and temperature intermediate between the two flows. This combined steam, being at a higher pressure and temperature than the original steam, would first enter the topping turbine, then flow to either the existing turbine or to the heat exchanger which heats the ORC working fluid. This results in substantially more efficient use of the energy of the working fluid stream. Alternatively, in this example, instead of adding a topping turbine one could replace or augment the existing turbine with a new turbine configured for the existing turbine outlet and the new system's higher pressure and temperature inlet, which would result in similarly increased efficiency.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 1 illustrates a schematic diagram of the thermal energy storage system architecture according to the example implementations.

FIG. 2 illustrates a schematic diagram of a system according to the example implementations.

FIG. 3 illustrates a schematic diagram of a storage-fired once-through steam generator (OTSG) according to the example implementations.

FIG. 4 illustrates an example view of a system being used as an integrated cogeneration system according to the example implementations.

FIG. 5 illustrates dynamic insulation according to the example implementations.

FIG. 6 provides an isometric view of the thermal storage unit with multiple vents closures open, according to some implementations.

FIG. 7 illustrates a system integrated with a combined cycle power plant to provide a thermal storage for operation of a steam power plant including optional cogeneration according to the example implementations.

FIG. 8 illustrates a schematic diagram of the thermal power cycle high-efficiency system (TPCHS) showing the integration of a thermal energy storage system with a thermal power cycle according to the example implementations.

FIG. 9 is the schematic diagram of the TPCHS of FIG. 8 with the heat exchange portion of the thermal energy storage system shown in greater detail, directed to heating of the primary working fluid by convection. It is understood in FIG. 9 that the TES may store heat in liquid or solid media; that heat exchanger 908 may be external or internal to the heat storage media; and heat may be delivered to heat exchanger 908 by convection or conduction.

FIG. 10 is a schematic diagram showing the TPCHS in accordance with another implementation, directed to heating of the primary working fluid by radiation.

FIG. 11 illustrates a schematic diagram of a TPCHS showing the integration of a thermal energy storage system with a geothermal Binary Rankine power cycle.

FIG. 12 illustrates a schematic diagram of a TPCHS showing the integration of a thermal energy storage system with a geothermal liquid-dominated power cycle.

FIG. 13 illustrates a schematic diagram of a TPCHS showing the integration of a thermal energy storage system with a geothermal vapor-dominated power cycle.

FIG. 14 is a schematic diagram that illustrates the cycle efficiency of a conventional waste heat recovery thermal power cycle system.

FIG. 15 is a schematic diagram that illustrates the cycle efficiency of a waste heat recovery thermal power cycle system with an integrated thermal energy storage system according to example implementations.

FIG. 16 illustrates the lifting of process temperature and cycle efficiency in a conventional waste heat recovery thermal power cycle system.

FIG. 17 illustrates the enhanced lifting of process temperature and cycle efficiency in a waste heat recovery thermal power cycle system with an integrated thermal energy storage system.

FIG. 18 illustrates the power generating efficiency of a waste heat recovery thermal power cycle system with integrated thermal energy storage system.

FIG. 19 illustrates the power time shift option provided by the integration of a thermal energy storage system with a waste heat recovery power generation cycle system.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems, and addresses the above-noted problems. A thermal energy storage system is disclosed that stores electrical energy in the form of thermal energy in a charging mode, and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
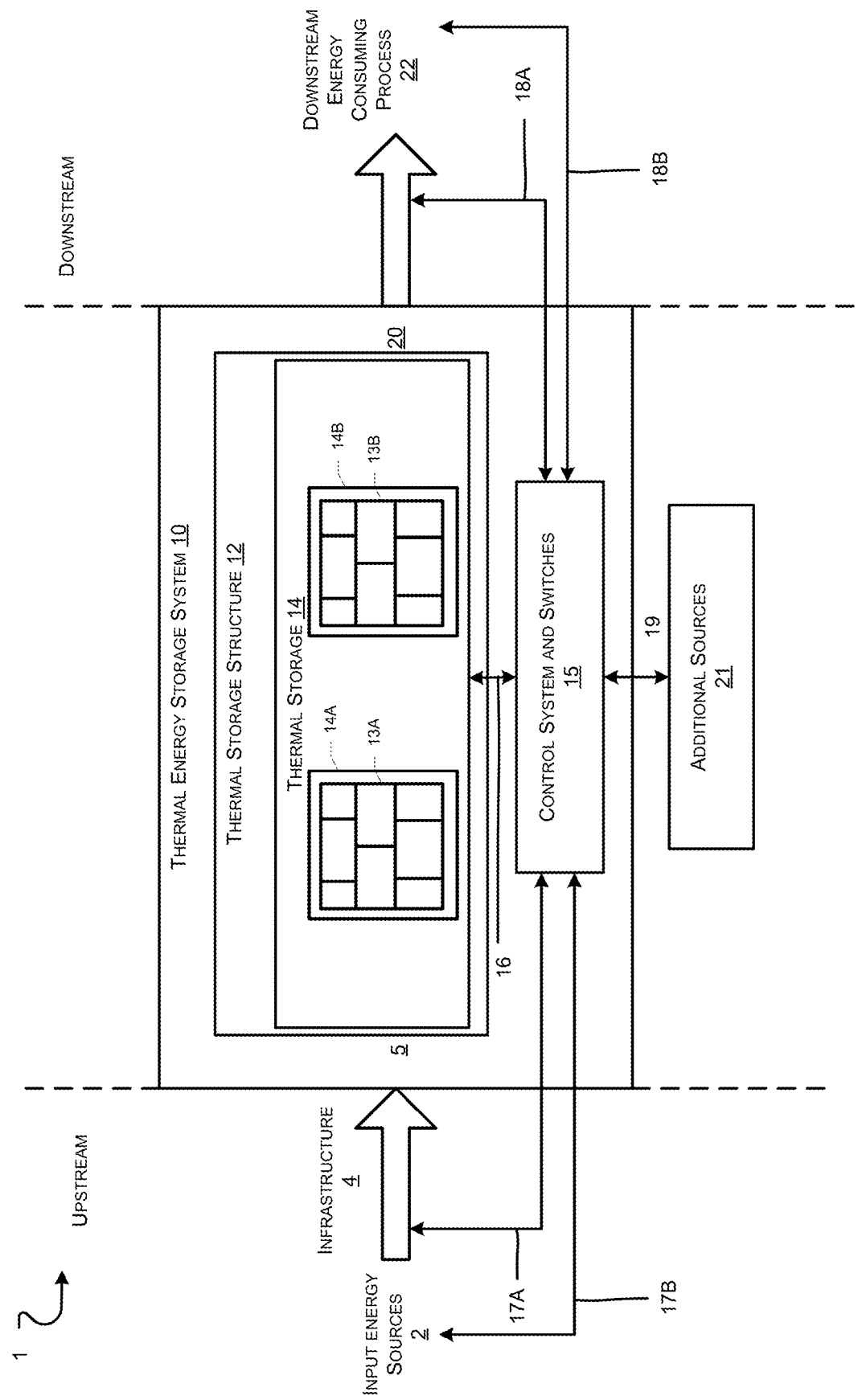
FIGS. 1 to 7 appear in parent U.S. patent application Ser. No. 17/668,333.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 13A, 13B) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2, and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
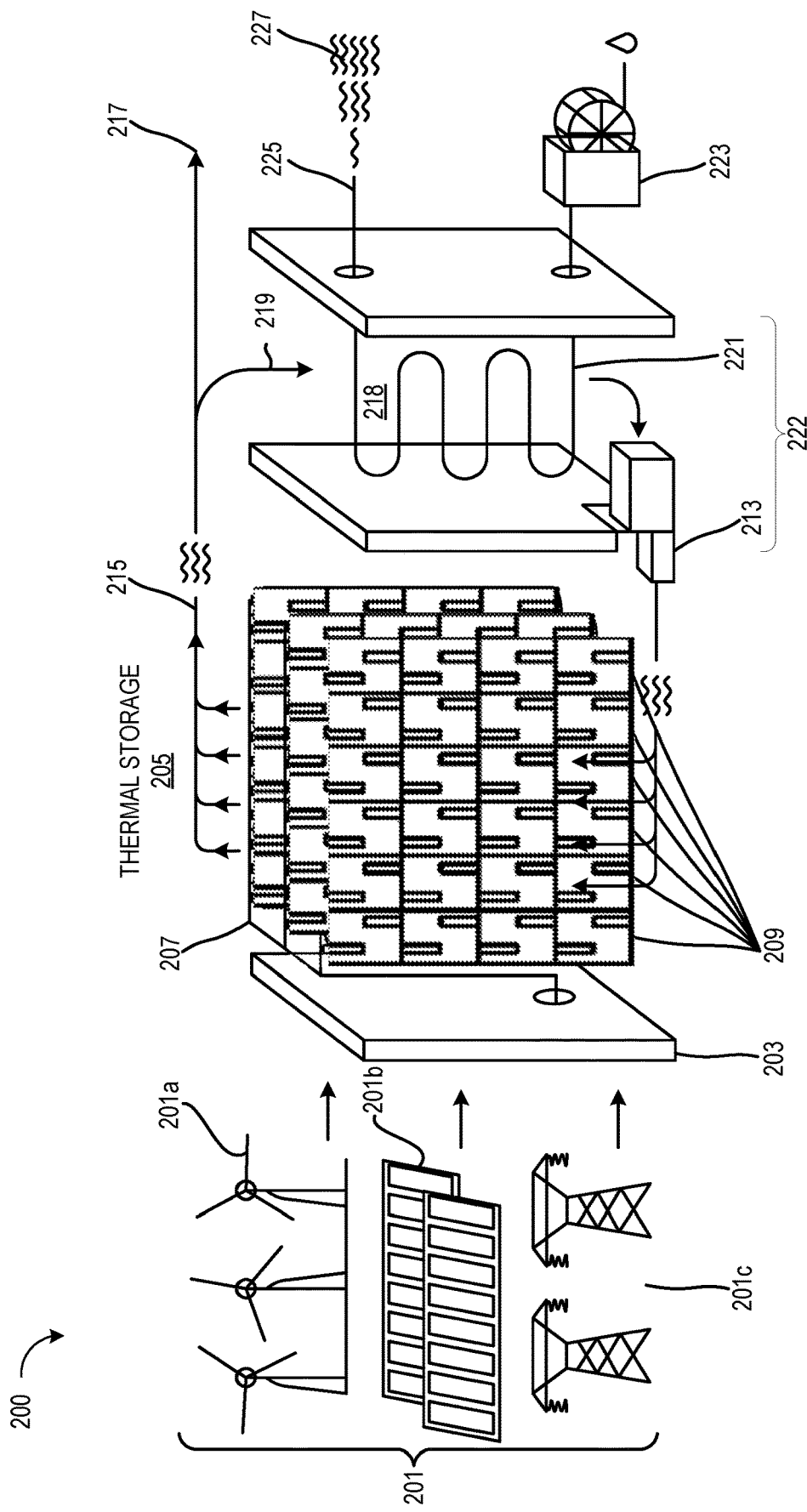

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201$a$, solar energy from photovoltaic cells 201$b$, or other energy sources may provide electricity that is variable in availability or price because the conditions for generating the electricity are varied. For example, in the case of wind turbine 201$a$, the strength, duration and variance of the wind, as well as other weather conditions causes the amount of energy that is produced to vary over time. Similarly, the amount of energy generated by photovoltaic cells 201$b$ also varies over time, depending on factors such as time of day, length of day due to the time of year, level of cloud cover due to weather conditions, temperature, other ambient conditions, etc. Further, the input electricity may be received from the existing power grid 201$c$, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage media 209. Thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented-one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers. By the release of heat energy from the resistive heating elements 207, heat is radiatively transferred to arrays 209 of bricks during a charging mode. Relatively hotter brick surfaces reradiate absorbed energy (which may be referred to as a radiative "echo"), and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
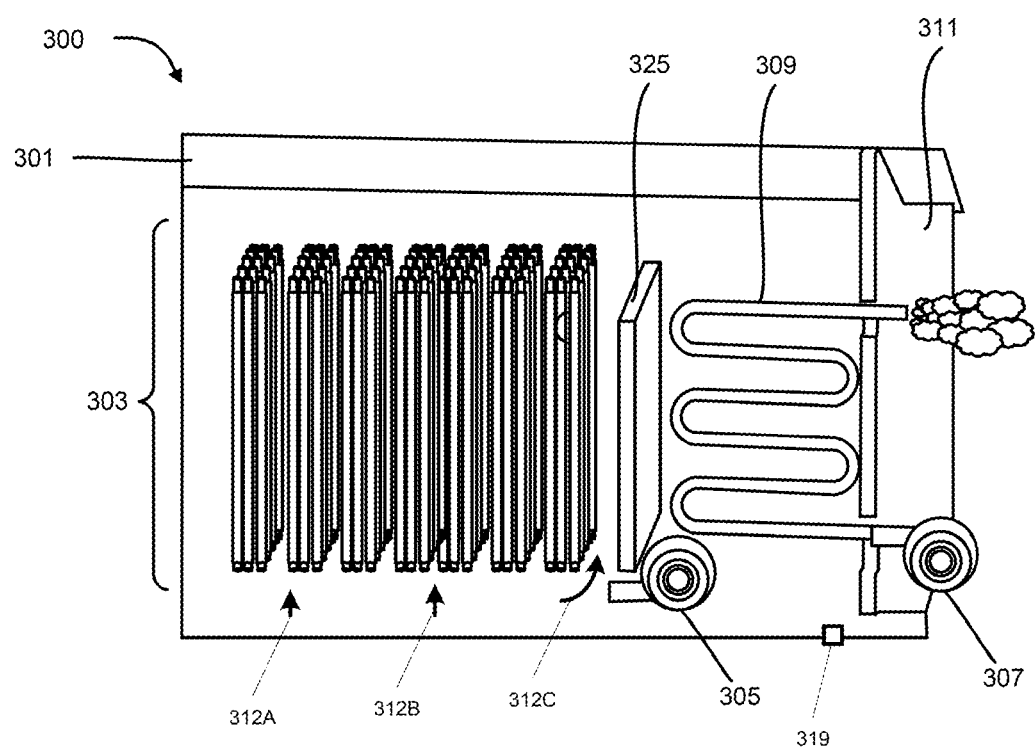

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319, and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water or another fluid pumped by the water pump 307. As the hot air heats up the water in the conduit, steam is generated at 311. The cooled air that has crossed the conduit (and transferred heat to the water flowing through it) is then fed back into the brick heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
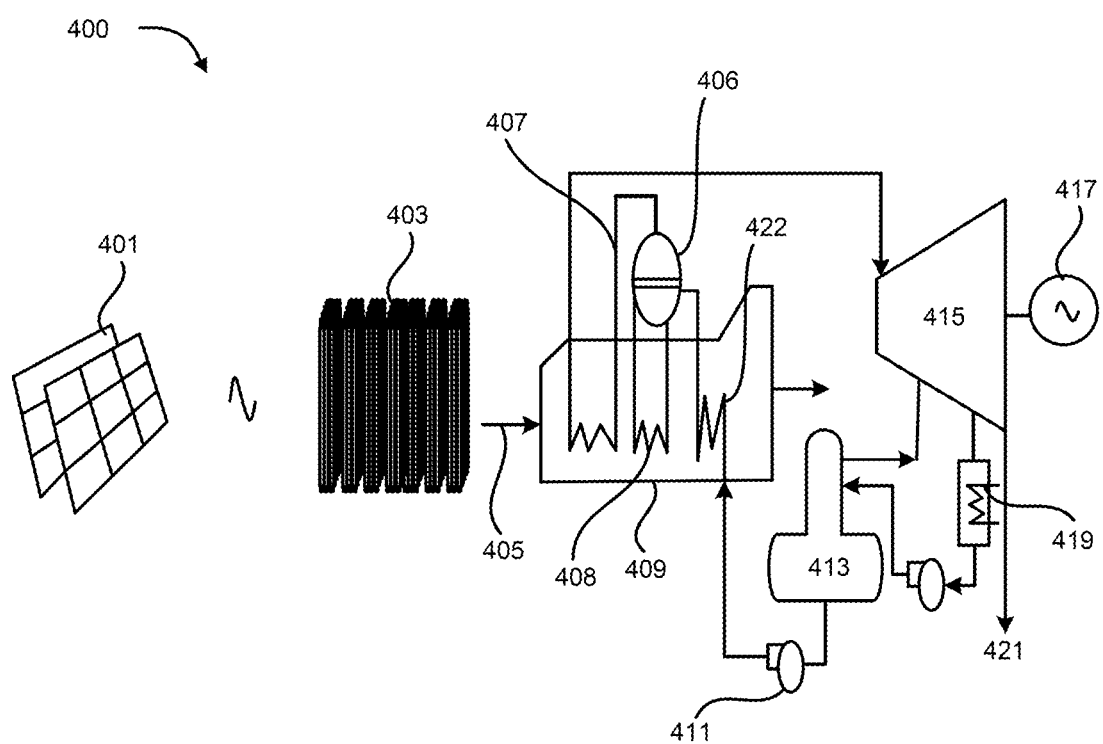
Figure 5:
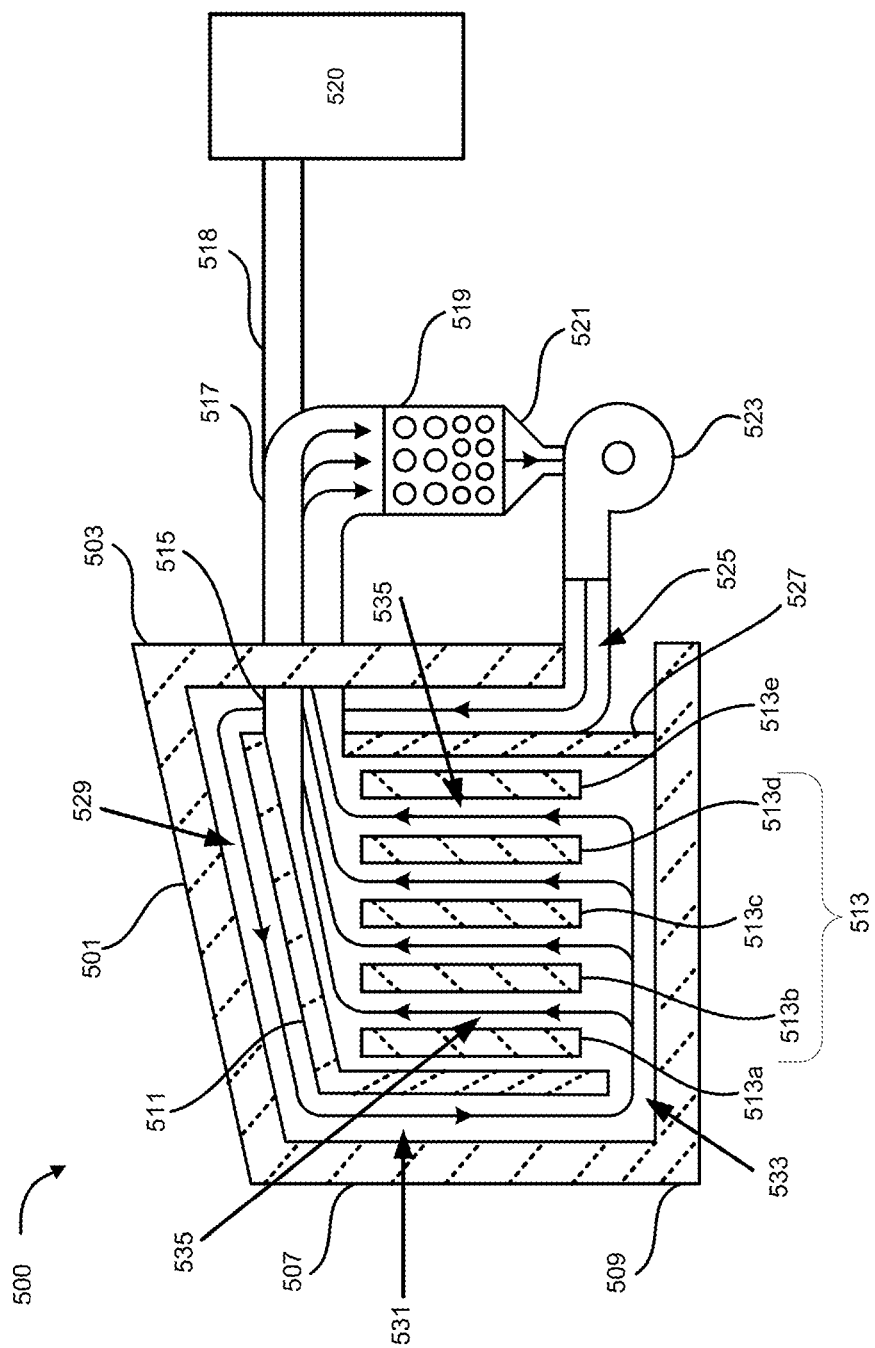

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 5, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process, or condensed at 419 and optionally passed through to a deaeration unit 413 and delivered to pump 411 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g. 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g. 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure, or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
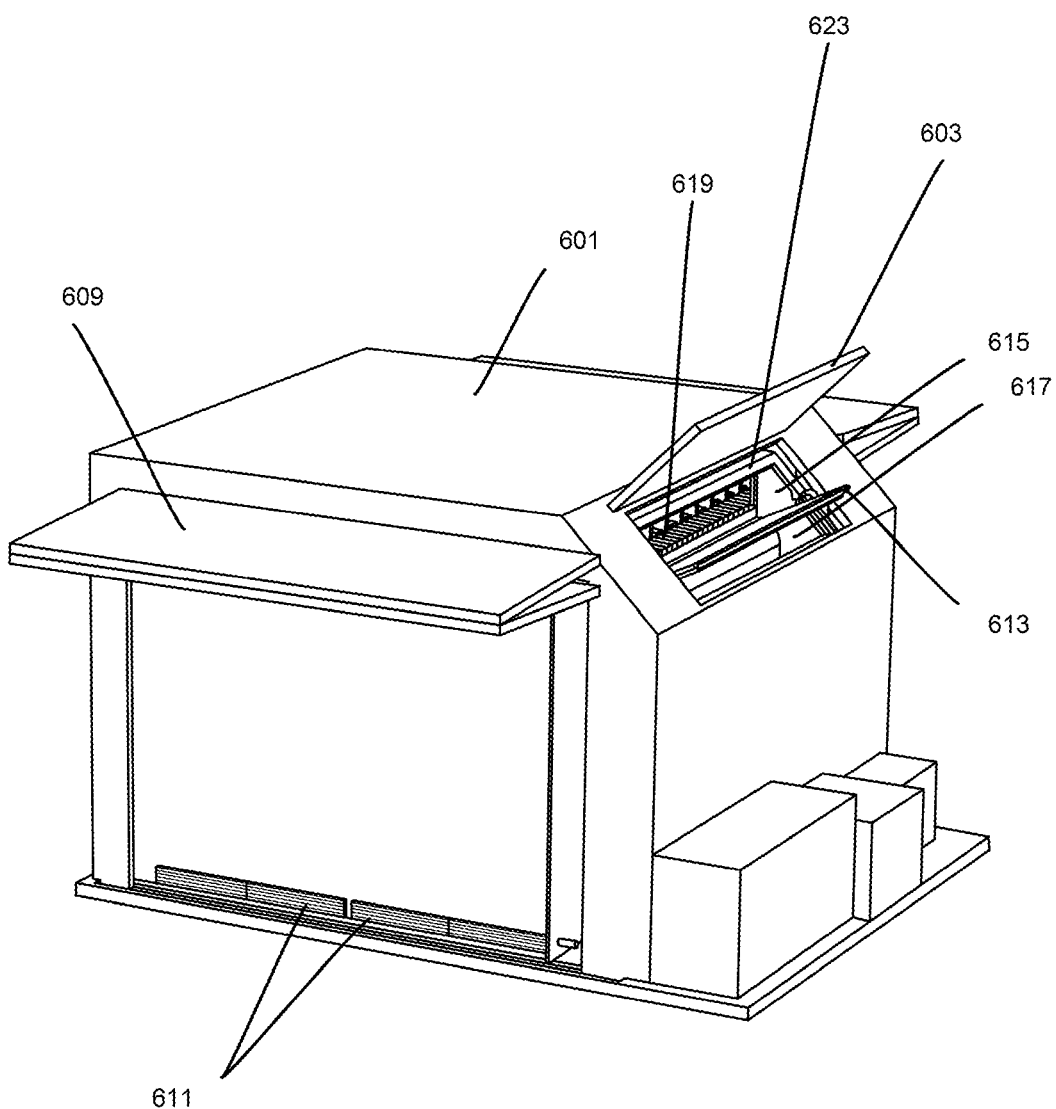

In an OTSG implementation, a first end of the conduit can be fluidically coupled to a water source. The system may provide for inflow of the fluids from the water source into a first end of the conduit, and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided further below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of bricks in the stack 513, the columns being represented as 513*a*, 513*b*, 513*c*, 513*d* and 513*e*. The heated fluid that is discharged from the upper portion of the columns of bricks 513*a*, 513*b*, 513*c*, 513*d* and 513*e* exits by way of an output 515, which is connected to a duct 517. The duct 517 provides the heated fluid as an input to a steam generator 519. Once the heated fluid has passed through the steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in the passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of bricks 513*a*, 513*b*, 513*c*, 513*d* and 513*e* and the air passages 535 are shown schematically in FIG. 5. The physical structure of the stacks and air flow passages therethrough in embodiments described herein is more complex, leading to advantages.

In some implementations, to reduce or minimize the total energy loss, the layer of insulation 511 is a high-temperature primary insulation that surrounds the columns 513*a*, 513*b*, 513*c*, 513*d* and 513*e* within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including the passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the bricks 513*a*, 513*b*, 513*c*, 513*d* and 513*e* within the housing so that the bricks 513*a*, 513*b*, 513*c*, 513*d* and 513*e* are not in contact with the outer surface 501, 503, 507 of the housing, and are thus thermally isolated from the housing by the primary insulation formed by the layer of cool fluid. The bricks 513*a*, 513*b*, 513*c*, 513*d* and 513*e* may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible to by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat necessary to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Bricks and Heating Elements

A. Problems Solved by One or More Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of the inner enclosure 623 and the inner surface of the outer enclosure define a fluid passageway through which fluid may be conducted actively for dynamic cooling or passively for failsafe operation.

The inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, the vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to the duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g. wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e. with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g. during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g. brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various embodiments releases low-pressure steam that is condensed to a liquid by a condenser 419, and then de-aerated using a deaerator 413, and again delivered to the HRSG 409.

Figure 7:
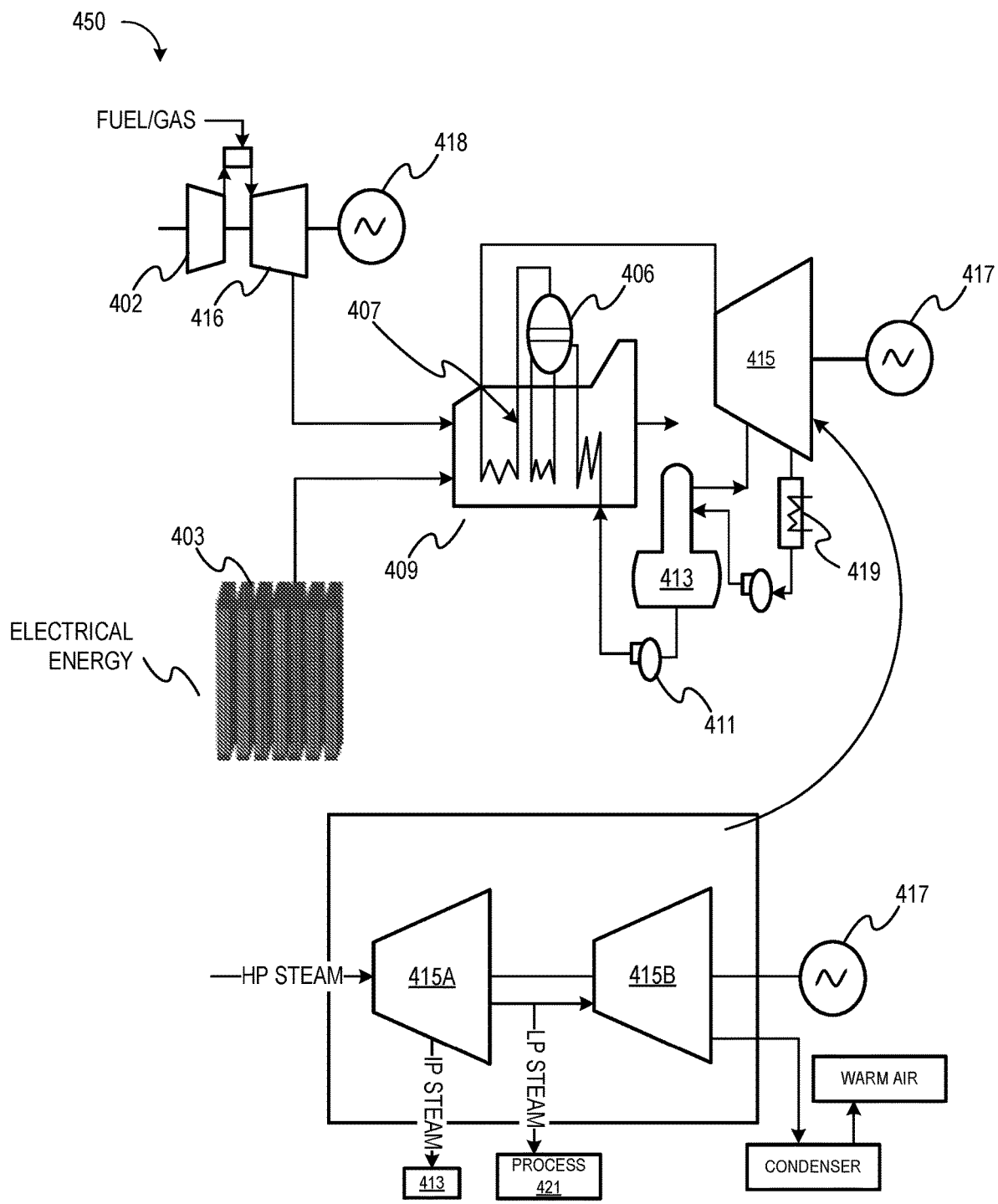

Referring to FIG. 7, in some example implementations, an integrated cogeneration system 400 as shown in FIG. 4 is coupled to a fuel-powered generator to provide a thermal storage integrated combined cycle plant 450 for efficient and reliable operation of a steam power plant. A combined cycle power plant may include a gas powerplant including a compressor 402 that mixes air into a fuel stream. The fuel and air mixture are then burnt in an expansion turbine 416 to generate pressurized exhaust, which is provided to a generator 418 to produce electrical energy. Further, the combined cycle plant may transfer the exhaust gas to a heat recovery steam generator (HRSG) 409. The HRSG 409 may include a positive displacement (PD) pump 411 under variable frequency drive (VFD) control to deliver water to the HRSG 409. When operating as part of a fuel-powered cycle, HRSG 409 uses the thermal energy of the exhaust gas from turbine 416 to convert the water into steam. Output of the HRSG 409 can be operatively coupled to a steam turbine generator 415, which upon receiving the steam from the HRSG 409, produces electrical energy using generator 417.

Further, the steam gas turbine 415 releases low-pressure steam that is condensed to a liquid by a condenser 419, and then de-aerated using a deaerator 413, and again delivered to the HRSG 409. For example, as shown in the expanded view, the steam turbine generator 415 receives high pressure steam from the HRSG 409. At a first turbine 415A that is powered by the high pressure steam, intermediate pressure steam is output to the deaerator 413, which may remove the oxygen from the steam, and provide as its output liquid fluid to the input of the HRSG 409 via PD pump 411. An output of the first turbine 415A may be low pressure steam, which is provided to an industrial process. A second turbine 415B that is powered by the remaining pressurized steam also generates electricity, and provides low pressure steam as its output to a condenser. An output of the condenser may be warm air, which may be used for an industrial process, such as grain drying or the like.

The thermal storage integrated combined cycle plant 450 can include the thermal energy storage structure 403 being fluidically coupled to the HRSG 409 of the combined cycle power plant. In one implementation, the heated air (at a predefined temperature) for the HRSG is provided by the thermal storage structure 403 alone or in combination with the exhaust emitted by the gas turbine 416. A control unit can control the flow of any combination of the heated air (from thermal storage structure 403) and exhaust gas by the gas turbine 416 into the HRSG 409, based on, for example, factors including load demand, availability and cost per KWH of available energy sources, cost per KWH for the operation of the combined cycle power plant, and thermal energy stored in the thermal storage structure 403.

In other example implementations, thermal storage structure 403 and a coal power plant may be integrated with a steam power plant through the HRSG 409 to provide another example implementation of a thermal storage integrated combined cycle plant for efficient and reliable operation of a steam power plant. The heated air being provided by thermal storage structure 403, alone or in combination with the exhaust emitted by the coal power plant can be supplied to the HRSG 409 for converting the water into steam for the steam turbine. A control unit may control the flow of any combination of the heated air (from the thermal storage structure) and exhaust gas by the coal power plant into the HRSG, based on, for example, factors including load demand, availability and cost per KWH of an available energy source, cost per KWH for the operation of the coal power plant, and thermal energy stored in the thermal storage structure.

Cogeneration Implementations

Thus, in accordance with the above, a number of cogeneration system implementations are possible and contemplated, a number of examples of which are now provided.

In one implementation, a cogeneration apparatus includes a thermal storage assemblage including a plurality of thermal storage blocks. A fluid movement system is configured to direct a stream of fluid through the fluid pathways to heat the fluid to a specified temperature range. The fluid movement device is configured to provide the heated fluid in the specified temperature range to a solid oxide electrolysis system configured to extract hydrogen from water and output the heated fluid at a lower temperature. A steam generator configured to receive the lower temperature fluid from the electrolysis system convert input feed water into steam. In various implementations, the steam generator is a once-through steam generator, and may also be a heat recovery steam generator. The thermal storage assembly comprises an enclosure containing the plurality of thermal storage blocks and a thermal barrier separating a first subset of the plurality of thermal storage blocks from a second subset of the plurality of thermal storage blocks. The fluid movement system is configured to direct the stream of fluid through the fluid pathways of one of the first and second subsets of thermal concurrent with an electricity source adding heat to another one of the first and second subset. In some implementations, the fluid comprises oxygen and nitrogen. Various sources of electricity may be used to charge the thermal storage assemblage. In one implementation, the thermal storage assemblage is configured to store thermal energy generated by a conversion of input electricity from an first input energy supply, the first input energy supply having intermittent availability. Implementations are further contemplated in which the thermal storage assemblage is further configured to store thermal energy generated by a conversion of input electricity from an second input energy supply configured to provide electricity on demand.

In yet another implementation, a steam generator is configured to receive the fluid to convert input feed water into input steam having a first pressure. A steam turbine configured to receive the input steam and provide output steam at a second pressure that is less than the first pressure. The system may include a steam turbine configured to provide an output steam at a second pressure that is less than the first pressure. A second fluid movement device may in various implementations is configured to move the output steam to an industrial plant for use in an industrial process. Such implementations may further include a second fluid movement device configured to move the output steam to an industrial plant for use in an industrial process.

The steam generator, in various implementations, is a once-through steam generator. The steam generator includes a plurality of conduits coupled to receive the input feed water, wherein selected ones of the conduits are arranged to mitigate scale formation and overheating. Ones of the plurality of conduits are arranged in the steam generator transversely to a path of flow of the lower temperature fluid.

In yet another possible implementation, a first steam generator is configured to, using the first fluid, convert input feed water into steam. A steam turbine configured to cause generation of electricity using the steam. The implementation also includes a preheater configured to, using waste heat from the steam turbine, preheat feed water provided to a second steam generator.

In an implementation, the first steam generator is a heat recovery steam generator, and may also be (or alternatively be) a once-through steam generator. Various implementations also include a condenser coupled to the steam turbine, wherein the condenser is configured to condense steam received from the steam turbine into water a recirculation pump configured to provide, as feed water to the first steam generator, water produced by the condenser. The second steam generator in various implementations is configured to generate steam using a second fluid from a second storage medium configured to store thermal energy. The preheater in various implementations is configured to output a third fluid to the thermal storage assemblage.

In some implementations, the measurement unit includes a separator configured to separate steam output from the steam generator from water vapor output from the steam generator, wherein the measurement unit is configured to determine the measured steam quality based on fraction of the water vapor output from the steam generator relative to the steam output from the steam generator. Implementations are further possible and contemplated in which the measurement unit is configured to determine the steam quality based on a flow velocity of steam output from the steam generator and a mass flow rate of the input feed water. With regard to the steam generator, implementations are possible and contemplated in which the steam generator is a once-through steam generator. The controller of such implementations may be configured to cause delivery of steam in accordance within a specified range of steam delivery rates. Accordingly, the controller is configured to specify the range of steam delivery rates based on forecast information. Various types of forecast information are possible and contemplated as a basis for the controller to specify the range of steam delivery rates. In various implementations, the forecast information includes weather forecast information. Implementations in which the forecast information includes expected electricity rates are also possible and contemplated. Similarly, implementations in which the forecast information includes expected steam demand are contemplated. It is noted that the controller may use one or more types of the forecast information mentioned here, while other types of forecast information not explicitly discussed herein may also be used in various implementations.

A controller in an implementation is configured to cause the fluid movement device to move fluid at a particular rate. Further contemplated in various implementations is a measurement unit configured to measure a parameter of steam output from the steam generator. The controller is configured to adjust the particular rate based on the measurement of the parameter of steam output. Meanwhile, the measurement unit in various implementations comprises a separator configured to measure a quality of the steam output from the steam generator by separating the steam into a liquid phase and a vapor phase. Alternatively, implementations in which the measurement unit is configured to measure a velocity of steam output from the steam generator are also possible and contemplated. The controller is configured to control an amount of fluid moved through the storage medium based on a weather forecast. The controller may also be configured to control and amount of fluid moved through the storage medium based on an expected difference in electricity costs on a first day and a second day.

Various types of electrical sources may comprise the intermittent energy supply in various implementations. In one implementation, the intermittent energy supply comprises a thermophotovoltaic generation system configured to convert thermal radiation into electrical energy. The intermittent energy supply may also, or alternatively, comprise a wind turbine configured to generate electricity. The intermittent energy supply may also a solar energy source configured to convert solar energy into electricity, which may be used singularly or with various ones of the other types mentioned herein. The electrical generator is configured in some implementations to provide electricity to a power grid.

The fluid movement device in one implementation comprises a closed fluid recirculation loop. Implementations may a pump, and wherein the pump is configured to force the input feed water through one or more conduits of the steam generator. With regard to the steam generator, one or more conduits may be provided in which feed water flows. In such implementations, the one or more conduits may be mounted in the steam generator transversely to a path fluid flow.

Various types of industrial processes are possible and contemplated in accordance with the above. In one implementation, the industrial process comprises production of biofuels. In another implementation, the industrial process comprises production of petroleum-based fuels. In yet another implementation, the industrial process comprises production of diesel fuels. Implementations in which the industrial process comprises drying of grains are also possible and contemplated. The disclosure contemplates industrial processes other than those measured here that may also benefit from use of an implementation of the cogeneration system/apparatus per this disclosure.

The cogeneration system in various implementations includes a controller configured to cause the steam generator to generate steam at a specified steam quality based on steam quality. The steam quality may be calculated by a comprising a measurement unit configured to determine the steam quality based on separation of steam and water vapor output from the steam generator. In another implementation, the steam quality may be calculated by a measurement unit configured to determine the steam quality based on measurements of steam outlet flow and feed water input flow. The steam quality may, in various implementations, be affected by the rate at which fluid is moved through the storage device. Accordingly, implementations are possible an contemplated in which the controller is configured to control a rate at which fluid is moved through the storage medium by the first fluid movement device. A controller is configured to cause the cause the fluid movement system to direct the stream of fluid, and further configured to use the measured steam quality as feedback to adjust a flow rate of the fluid to maintain the measured steam quality within a specified steam quality range.

The steam generator in one implementation is a once-through steam generator. However, implementations in which the steam generator performs at least some recirculation of feed water are also possible and contemplated. Accordingly, some implementations include a condenser configured to receive at least a portion of the steam from the steam turbine and configured to condense the portion of steam into third feed water, while a recirculation pump is configured to provide the third feed water to the first steam generator.

In various implementations, the steam generator is a heat recovery steam generator. The measurement of steam quality output by the steam generator may be performed in various implementations, which may thus include a measurement unit configured to determine a measured output steam quality and a controller configured to adjust a current output steam quality to within a specified range using the measured output steam quality as feedback. In such implementations, the controller is configured to cause fluid movement device to adjust a rate of fluid flow through the storage medium in accordance with the feedback and the specified range of steam quality.

II. Thermal Energy Storage System for Thermal Power Generation Cycle Top-Up

Section II of the Detailed Description relates to the newly added disclosure of this continuation-in-part application. In the following description, the thermal energy storage system, thermal storage medium, processes for use and variations thereon may be any of the range of implementations described throughout this continuation-in-part application, including in any combination with the variations discussed above that were described in the aforementioned U.S. Pat. No. 11,603,776.

Inventive Concept

The present application is an inventive system and processes for improving the power output, power generation efficiency, and power controllability of geothermal and waste heat recovery power generation by an innovative combination of high-temperature heat from a thermal energy storage (TES) system that converts intermittent electricity to heat, stores heat in liquid or solid media, and delivers relatively high-temperature heat to an outlet fluid on demand. The present innovations combine energy from a geothermal, biomass combustion, or waste heat recovery source, which is available at a first temperature, with heat from the TES system at a higher temperature, in such a manner as to selectively increase the power output of one or more thermal generators. The innovations combine a high-temperature heat flow from the TES system with a lower-temperature heat flow in a beneficial manner such that the cycle efficiency (percent of energy converted to work) and mass flow (total energy) both increase. Importantly, this combined configuration delivers higher power output than the systems (the TES system and the WHR/biomass/geo-thermal system) could deliver operating separately. Several means of combining these heat flows are disclosed so as to achieve this higher-power output and efficiency. Furthermore, we disclose operation of this temperature and mass flow increase in a selective manner, with a system that may be linked to real-time power demand, electricity price, electricity availability, or grid services such as voltage and frequency support. Furthermore, we disclose the operation of the charging circuits of the TES in a manner to selectively consume some or all of the power generated by the combined system, so as to move net power output from a first time, such as when electricity supply is in excess, to a second time, such as when electricity demand is high. Furthermore, we disclose the operation of the charging circuits of the TES also to be powered by grid power and/or non-grid connected wind or solar generation. By combining this electricity storage function with waste heat or geothermal heat supply, the effective power generation efficiency of the energy storage system may be substantially increased.

In one embodiment, a first flow of steam or heated working fluid from a waste heat or geothermal heat source is heated to a second, higher temperature and/or pressure by one of several means.

In one embodiment, the first flow is heated to a higher temperature by passing through a heat exchanger heated by the TES system.

In another embodiment, the first flow is entrained via a thermal vapor compressor (steam jet) which is fed by a second higher-pressure, higher-temperature flow from the TES system and which creates a combined third flow ("result flow") which is at higher temperature, pressure, and mass flow than the first flow.

In another embodiment, the first flow passes through a heat exchanger in which it gives up its heat to preheat a second flow of feedwater going into the TES system, thus providing a portion of the thermal energy required to deliver a steam at the temperature and pressure delivered by the TES system, thus increasing the result flow steam delivered per unit of energy withdrawn from thermal energy storage.

In one embodiment, valves controlled by a controller may adjust the flows so that the first fluid may flow in its original pattern without further heating by the TES system.

The resulting flow may be provided to an industrial application, which receives the first working fluid at the increased temperature and/or pressure. The transfer of heat from the thermal energy storage system to the result flow may occur by conduction, convection, radiation or direct transfer of a second working fluid of the TES system that is combined with the first working fluid. The industrial application may be a turbine combined with its a generator to provide electricity, or another industrial application that uses the primary working fluid, either alone or in combination with the second working fluid, as explained in further detail below.

In some embodiments associated with the industrial application as a turbine combined with a generator, the present application discloses an inventive system and processes for boosting the temperature of a working fluid in thermal power generation cycles. The inventive system includes a thermal energy storage (TES) system that captures and stores intermittent electrical energy, such as variable renewable energy, by converting it to high-temperature heat stored in liquid or solid media, and discharges high temperature heat externally to a thermal power generation cycle. The present innovation includes a first lower-temperature heat source which may be geothermal heat, heat stored in sub-surface formations, or heat recovered from an exhaust or waste heat source; and a second, high-temperature thermal energy storage system.

The turbine may be connected to a generator that is configured to provide electrical energy as an output. Electrical energy may be delivered to a grid or another use, or selectively electrical energy may be returned as input electrical energy to charge the TES system, with a controller determining such selective flow, depending on time-varying parameters such as price, carbon intensity, availability of renewable electricity, and/or electricity demand.

In the case of direct heat transfer, the second working fluid generated by the TES system has substantially the same composition as the first working fluid heated by the primary heat source, which may be the industrial application. The second working fluid has a higher temperature and/or pressure than the first working fluid. When the second working fluid is combined directly with the first working fluid, the temperature, pressure and mass flow of the first working fluid are increased.

More specifically, high-temperature heat from the thermal energy storage system is used to increase the temperature of a working fluid. The working fluid may be steam, gas, supercritical $CO_2$ or vaporized organic fluid. The working fluid is heated to a first temperature by a lower-temperature heat source prior to the inlet of the expansion stage in a thermal power generation cycle (e.g., Rankine Cycle, Brayton Cycle, supercritical Brayton Cycle). As a result, the higher temperature combined heat flow increases the efficiency of conversion of heat to work by the thermal power generation cycle. A thermal power generator associated with the second heat source may achieve beneficially greater flexibility in its net power output, by enabling the TES system to be charged by the thermal power cycle as determined by human or automatic controls. Thus, the present invention may improve the efficiency of thermal power cycles.

The present invention combines a high-temperature electrically heated thermal energy storage TES system, which accepts an inlet fluid stream and heats that fluid stream to a higher temperature. By combining a TES with a source of low- to medium-temperature heat as per the present innovation, the following benefits are observed:

The electricity output per unit of low- to medium-temperature heat (kJ electric out/kJ heat in) rises significantly.

The electricity output per unit of electricity used in charging the TES rises significantly, as the total kJ heat in (kJ electric out/kJ heat in) drives the thermal power generation cycle, but only a portion of the total kJ heat is delivered by the TES.

While the medium- to low-temperature heat source may operate continuously, in many instances electricity is desired in a time-varying manner, for example, following demand in an electricity grid. By enabling the TES system to be charged by the output of the power generation cycle (as well as optionally by one or more other power sources), electricity may be returned to storage during times of low electricity prices or low grid demand for power, and selectively delivered to the system output during periods of higher demand and higher prices.

The TES system may be fixed in series between the medium to low temperature heat source and the inlet to the thermal power cycle and may either directly raise the temperature of a first fluid flow emanating from the low to medium temperature heat source, or may use such first fluid flow to preheat a second working fluid that is further heated by the TES before being supplied to a thermal power cycle.

A TES system can be charged from multiple sources, including grid power, local wind or solar power. A TES system according to the present disclosure may also be charged from the local turbine generator, so as to beneficially use power generated from a relatively constant source such as geothermal or waste heat when power export to a first power use such as the grid is undesired or unallowed. This allows beneficial use of the continuously available heat and allows relatively continuous operation of the turbine, increasing its life and reducing the maintenance costs of repeated start-stop operation.

Injecting high-temperature heat to the steam turbines inlet condition allows the power generation cycle to operate (a) at higher pressures and/or (b) with a higher degree of superheat. This makes the hot-side (turbine inlet) temperature higher, increasing the efficiency of the process. The TES system may discharge stored heat as a high-temperature fluid, which contacts a thermal power cycle working fluid (e.g. steam) via heat exchanger. The TES discharge fluid may be a gas (e.g. air, pure gas such as $CO_2$, or some other mixture) or a liquid (e.g. water, organic liquid such as oil, or liquid metal). The hot TES fluid may either contact the working fluid stream directly before the primary heat supply (preheating), or after the primary heat supply (superheating).

The TES system may also add stored heat radiatively from a hot storage medium in the TES to the thermal power cycle working fluid. This thermal storage medium may be a solid (e.g. refractory, graphite, rock, or metal) or liquid (i.e. water, liquid metal, oil). The thermal storage medium may also be the thermal storage heat transfer fluid where the liquid storage medium exchanges heat with the power cycle working fluid directly. The effect of this is to raise the temperature of the turbine inlet, which ameliorates the problems of low efficiency related to less effective capture of the heat available to the cycle.

Further, the TES system may also provide direct heating to the working fluid from the primary heat source. For example, the primary heat source may be an industrial application that uses hot air or steam at a high temperature and/or pressure as an input, and has a waste byproduct of the hot air or steam at a lower temperature and or pressure as an output, which is recovered as waste heat. The primary working fluid is heated by directly injecting the fluid being generated by the TES system, whether it is hot air or steam, such that the primary working fluid has an increased temperature, pressure and mass flow that is provided to industrial application.

The TES system is designed to be charged intermittently with electricity, but supply discharge energy in the form of the high-temperature fluid on a controlled or continuous basis. This allows flexibility in connecting with the grid by electrically connecting a turbine generator with the TES charging system. As a result, the TES system can store electricity generated by a turbine in order to prevent grid-ordered shutdowns of generation when power demand is low. TES system designs according to the present disclosure can incorporate the variations and features described above in this application, in combination with the features and applications described below.

System Elements

An important implementation of the inventive system and methods described herein (which may be referred to as a Thermal Power Cycle High-Efficiency System, or TPCHS) includes applications with thermal power cycles, of which those that have constraints around the heat-source temperature benefit particularly well. An TPCHS may include a high-temperature heater in the form of high-temperature electrically heated thermal energy storage (TES) unit, which provides value by increasing the temperature of the turbine inlet working fluid by injecting higher-temperature heat. The TES unit may be an open or closed loop thermal storage system or thermal battery that charges intermittently via electricity. Here the high-temperature heater may supply heat primarily to the normally temperature-constrained thermal power cycle working fluid before its entry to the expansion portion of the cycle and after the primary heat exchange section (i.e., superheating), with the initially intended heat source such as a waste heat recovery steam generator. The high-temperature heater may also supply heat before the primary heat exchange system (i.e., preheating).

As explained below, this inventive system and methods are not limited to the case of thermal power cycles, and the primary working fluid may be directed to other industrial applications, either in combination with the turbine and generator, or without a turbine or a generator.

The inventive TPCHS can improve the overall efficiency of any process that uses a thermal power cycle, especially one that faces narrow constraints that limit the turbine inlet temperature. This is done by supplying higher-temperature heat to the turbine inlet feed, raising the temperature of the turbine inlet and thus increasing the overall thermal efficiency of the thermal power cycle. The TPCHS includes a TES unit that charges intermittently from an electrical source, whether that be grid power, otherwise curtailed electricity, intermittent renewables, or the thermal power cycle's turbine generator. Electricity can be received when it is not in demand for other purposes, stored as thermal energy in a solid medium, and, when desired, delivered as heat which is transformed back to electricity using existing and/or new turbine infrastructure.

The TES can discharge either constantly or intermittently for greater operating flexibility. For example, there are some use cases where electricity generation is less desired, say at periods of low wholesale electricity prices, where the TPCHS has the capability of pausing the thermal power generation cycle boost.

The electric-to-thermal storage is an advantageous feature that provides a logical operating cycle. Often steam turbines run around the clock, shutting down only for maintenance or regularly scheduled shutdowns. Providing a TES to a system's operating cycle allows greater flexibility in demand response.

For example, a steam turbine powered in a thermal power generation cycle by the captured waste heat from a steam methane reforming plant exports power to the grid. Due to the increasing intrusion of intermittent renewables such as solar energy on the grid, there are larger variations in hourly wholesale electricity prices. Electricity is less valuable when the sun is up and solar arrays are producing more electricity than is demanded (in fact, sometimes the power selling price is negative), and is more valuable when intermittent renewables are not producing power.

A steam methane reformer (SMR) operates around the clock continuously for much of the year and the attached waste heat steam turbine follows the operation of the SMR. During periods of low grid electricity prices, a facility can bypass the grid and use the "low value" electricity to charge the TES. At times when power prices are high, the TES stops charging, and electricity generated by the turbine is sold to the grid.

The TES thus has the capability of increasing the overall thermal efficiency of the SMR plant around the clock by raising the temperature of the power cycle. This would require a new thermal power cycle specifically designed around the higher-temperature heat source. There are several auxiliary benefits that arise from this invention's integration with a plant. One is that downtime and maintenance are significantly reduced. In conventional systems, lower-temperature steam condenses during expansion in the turbine. The liquid condensate droplets damage and degrade the blades and stators of the turbine, which eventually leads to shorter lifespan of the machinery, increased maintenance cost, and turbine downtime. The reduced downtime of an TPCHS according to the present disclosure reduces this damage and degradation, thereby reducing maintenance time and costs and minimizing turbine downtime.

Additionally, the TPCHS provides the turbine generation with an additional path for added flexibility, which results in further benefits. In current systems, grid operators may communicate with power-generating facilities and order temporary shutdowns to prevent an overflooding of the grid. The TPCHS allows unwanted generation to be routed towards charging a TES instead of requiring a shutdown of the turbine. Shutdowns and the subsequent start-up negatively affect the cycle machinery's lifetime and maintenance costs. In addition, during such shutdowns value is not being extracted from the thermal resource, which is constantly available for many of the core applications.

The present application discloses methods for externally supplying heat to an existing thermal cycle with a low heat-source temperature, with the goal of improving the power generation efficiency for better utilization of the low heat-source temperature heat. The thermal cycle may be a thermal power generation cycle, or another industrial application that is not associated with power generation, or a combination thereof. Some examples of thermal power generation cycle systems with relatively low heat-source temperatures include:

Waste heat recovery cogeneration steam turbines where the hot exhaust from combustion in a higher-temperature industrial or power generation process generates steam to be used in a steam turbine for power generation.

Low-grade waste heat recovery in an Organic Rankine cycle that extracts low-temperature heat from an exhaust stream to supply heat to the cycle.

Geothermal thermal power generation cycles, where liquid or gaseous fluid heated from a geothermal resource is pumped from the subsurface for use in thermal power generation cycle power generation.

Biomass Steam Boiler Turbines (BSBTs), where biomass is combusted in a furnace or a fluidized boiler to generate heat, which is then used to generate steam.

Industrial Applications

Any thermal power cycle will benefit from the thermal storage top-up (higher temperature heat addition) described above. In some settings, the benefits are even greater. Generally, thermal power cycles that have some constraint on their operating temperature will find the most added benefit. Below, a few of these specific cases and the problems that the present inventions address is explored further.

Waste Heat Recovery

In waste heat recovery applications that use a thermal power cycle to extract power from waste streams, the heat source temperature is necessarily limited by the temperature of the exhaust or other fluids released by the primary process of a facility. In some cases, the temperature of a flue gas limits the maximum temperature of any steam or organic fluid vapor generated in a heat exchanger heated by such flue gas to a temperature which results in a relatively inefficient thermal power cycle. By enabling such steam or organic fluid vapor to be further heated by a TES before the input to a turbine, power cycle efficiency may be increased, thus better utilizing the waste heat of the system.

Many industrial processes require heat. This thermal energy can come from combustion, electricity (resistance, induction, electric arc), nuclear fission, or another exothermic reaction. Some of the energy may be used as intended in an industrial process, such as burning natural gas to supply high-temperature heat to a steam methane reactor or exposing charged iron to an electric arc in an electric arc furnace. Once the primary purpose of the combustion energy has been fulfilled, there is often an amount of thermal energy to be extracted. It is in an industrial facility's best interest to extract as much value from the remaining energy (typically exiting as flue gas exhaust) as possible. Often this is done by capturing the waste heat via heat exchangers for use in a thermal power cycle. Depending on a specific facility's primary thermal process, the temperature of the waste heat may vary. The result of this is that the efficiency of the turbine may be lower for lower-temperature waste heat, and less power is generated per unit of captured thermal energy. The current inventive system increases the electric power available per unit of captured waste heat by adding higher temperature heat upstream, removing the lower-temperature constraint of a specific facility's process and allowing better overall utilization of the waste energy available.

The present invention can be integrated into existing or new facilities. In the latter case, the system can accommodate differences in the operating conditions of a thermal power cycle. For example, the temperature of the waste heat available may limit the pressure of the steam going into the turbine inlet due to the boiling point of water increasing with increasing pressure. Turbines generate work by extracting power from the pressure drop across the turbine. This means that in addition to increasing overall efficiency of the thermal power cycle, the overall capacity of the power generation cycle can be increased as well, increasing the duty of the compression stage (pump or compressor) of the thermal power cycle. In an existing facility, this would require changing the cycle components to operate at the new temperature and pressure.

Figure 8:
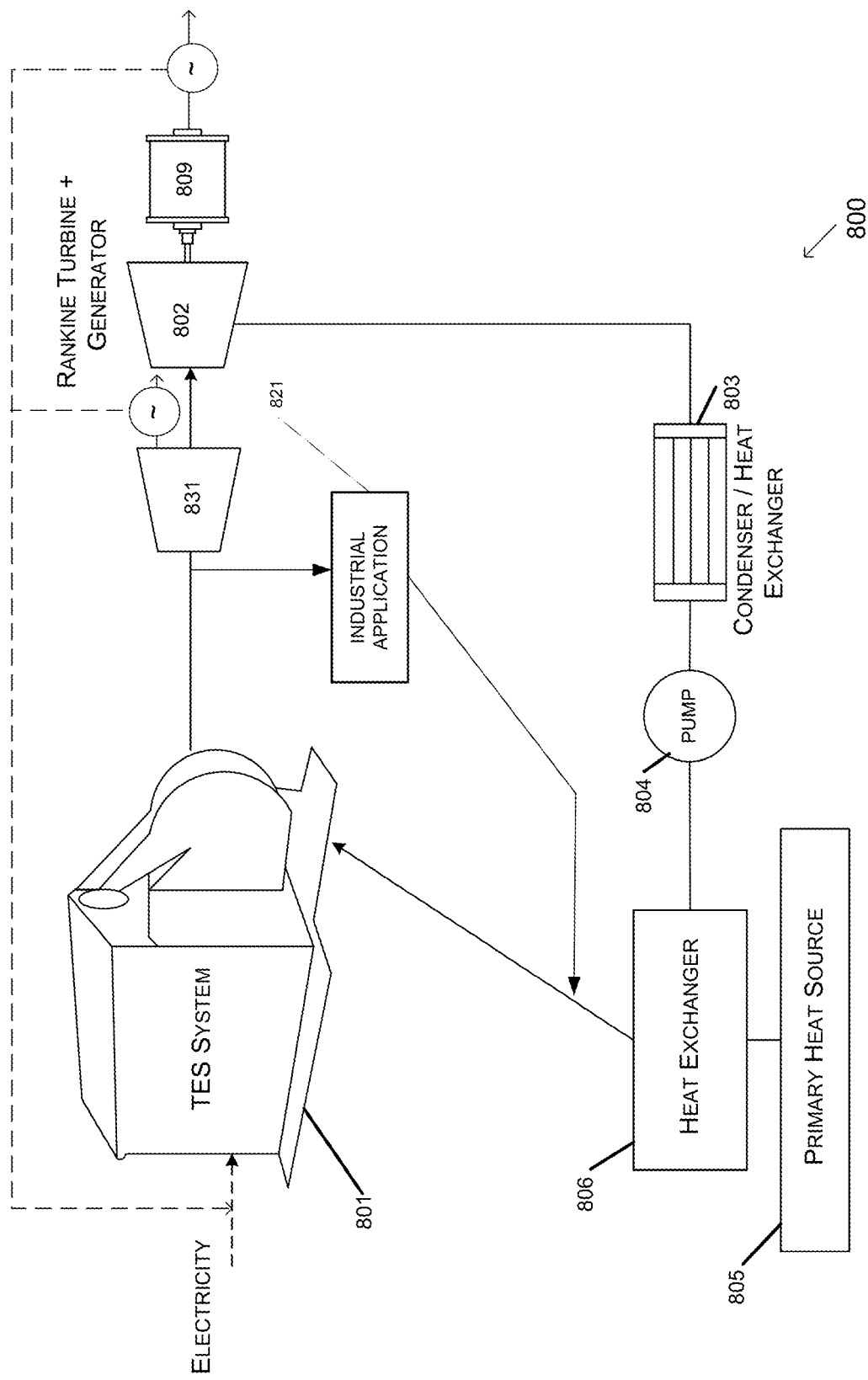
FIGS. 8 to 19 include new disclosure of this continuation-in-part application.

FIG. 8 shows one implementation of a thermal power cycle high-efficiency system (TPCHS) 800 of the present invention wherein a thermal energy storage (TES) system or unit 801 is integrated within a thermal power cycle system configured to utilize waste heat to generate electricity. In this implementation the power cycle is Rankine cycle where a cycle working fluid (typically water) circulates through a minimum of a heat exchanger 806, turbine 802, condenser 803 and a pump 804. The TES 801 is integrated between the heat exchanger 806 and the turbine 802, and receives electricity from the grid or variable renewable energy as its input.

The cycle working fluid flows in a clockwise direction as represented by the sold line connecting elements 801, 802, 803, 804 and 805. The primary heat source 805 in this example implementation is waste heat flue gas, but it is understood that it may be any low temperature heat source, whether it be from a geothermal resource, a fired boiler or electric origin. The arrow moving from the primary heat source 805 to heat exchanger 806 is an abstract connector representing the flow of heat, and not representing a material stream of mass entering the cycle. The TES 801 charges electrically (not shown here but described in detail in above in this application with reference to FIGS. 1, 2, 3, and 5) from any source, such as a grid connection, a turbine generator connection, or an off-grid renewable source.

The TES 801 includes a built-in heat exchanger which is configured to add heat to the cycle working fluid either by convection where hot fluid from the TES transfers heat to the cycle fluid, and/or radiatively where a solid storage medium at a much greater temperature than the cycle fluid radiates heat to the cycle fluid. Heat exchanger 806 converts the latent heat of the low temperature heat source 805 into the latent heat of vaporization of the working fluid received from pump 804. The cycle working fluid exits the heat exchanger 806 as a partially heated fluid (e.g. steam) and then flows through the heat exchanger of the TES 801 before flowing to the turbine 802. The condenser 803 and pump 804 represent the heat rejection and compression stages, respectively, of a conventional thermal power cycle. Thus, the temperature of the cycle working fluid is boosted or lifted due to absorbing heat discharged from the TES 801, thus contributing to the efficiencies and advantages described above.

The cycle working fluid may also be used as an input to an industrial application 821. More specifically, in situations where the cycle working fluid can be a direct input to an industrial application, such as steam, hot air or the like, the flow may be split between the turbine 802 and the industrial application 821, so as to maintain an appropriate mass flow balance for both processes. The industrial application 821 may have waste heat as a byproduct, which may be fed back directly into the working fluid stream, depending on the pressure and temperature of the output. Alternatively, although not shown, the output of the industrial application may be provided to the condenser 803 and pump 804, depending on its pressure and temperature. In some configurations, the industrial application 821 may replace the turbine 802, particularly with respect to the use of direct heating as explained further below with respect to FIG. 10A. Further, as shown at 831, a high-pressure turbine is optionally provided, which receives the fluid to generate electricity, and low to intermediate pressure steam as a byproduct, which is provided to the generator 802. This approach may be particularly useful in retrofitting to existing turbines that are designed for operation with low pressure to intermediate pressure steam.

Figure 9:
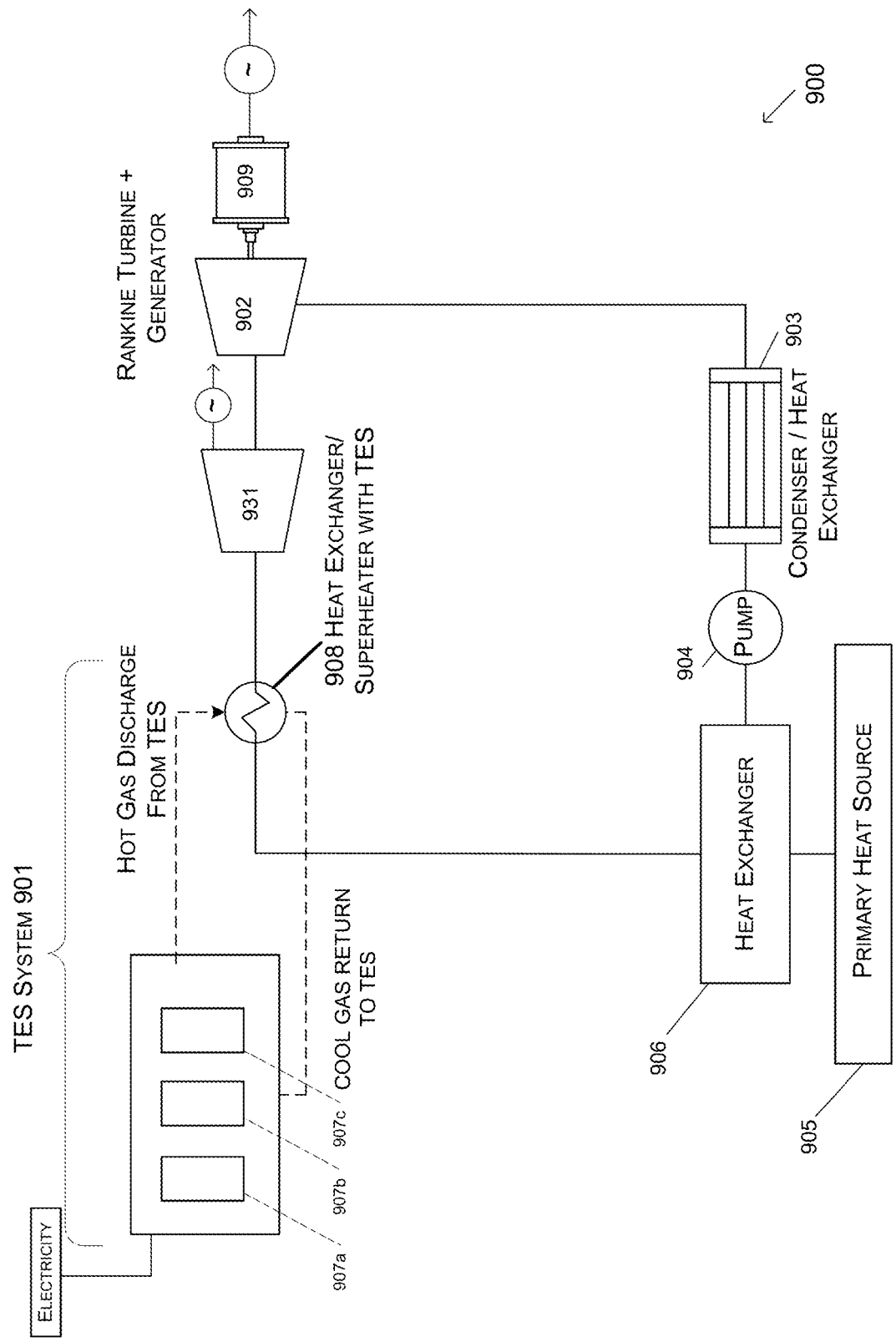

In FIG. 9 the thermal storage system 801 of FIG. 8 is shown in greater detail to provide a high-level illustration of the thermal operation of the unit. The dashed line represents the circulation of the TES working fluid (e.g. air, $CO_2$, or a mixture thereof) through the thermal storage units (TSUs) 907a, 907b, 907c (or, e.g., in pipes across the top of the TSUs) for discharge as hot gas to the internal heat exchanger 908 before returning to the thermal storage media as cooler gas. As described above, the TSUs comprises may comprise refractory material and the internal heat exchanger may comprise a once through steam generator (OTSG). The cycle working fluid (represented by the solid line through 901, 902, 903, 904, and 906) flows clockwise in FIG. 9 in either an open or closed loop through the heat exchanger 608 of the thermal energy storage system 901 (closed loop shown), absorbing heat from the high temperatures within the TES, which is charged with electricity heating up the TSUs 907a-c within the TES, as described in detail earlier in this application. The TES working fluid picks up heat from a heated thermal storage medium convectively. The hot TES fluid is then discharged to transfer heat via heat exchanger 608 to the cycle working fluid stream, with the goal of increasing or lifting the temperature of the cycle working fluid prior to the expansion or turbine stage of the power cycle. The work output of the turbine 902 generates electricity 910 via generator 909. As explained above, a high pressure turbine 931 is optionally provided to generate electricity, as well as low to intermediate pressure steam that can be provided to the turbine 902.

Figure 10:
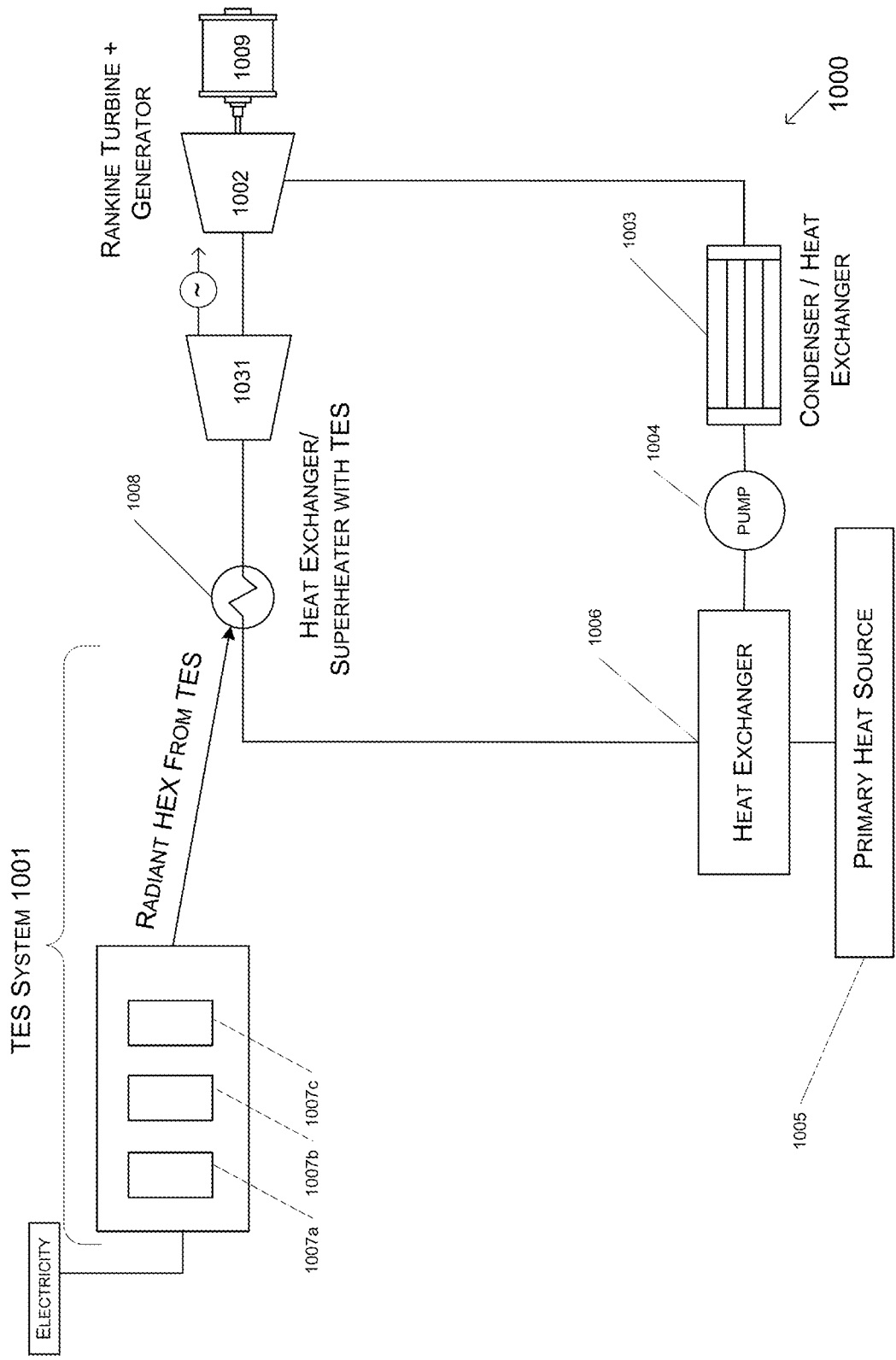

FIG. 10 shows another implementation of the TPCHS 1000 wherein high temperature heat from the TSUs 1007a, 1007b, and 1007c of the TES 1001 directly radiate heat to the cycle working fluid in internal heat exchanger 1008 without need for a TES heat transfer fluid. This could work by, for example, the cycle working fluid being flowed through a pipe or tube that is exposed directly to a radiant heat source such as the thermal storage medium.

In both of the indirect heating approaches shown in the figures and explained above, the industrial application is a turbine and a generator. Accordingly, the electrical energy that is generated may be provided to grid operators. Although not illustrated in the drawings, the electrical energy may be fed back as an input to the TES system 1001 based on one or more parameters, as explained above with respect to FIG. 8.

Additionally, the boosted working fluid may be provided as the input to industrial application other than a turbine and generator, or the boost of working fluid may be split between the turbine and generator and an industrial application. These aspects are described in greater detail below with respect to waste heat recovery using direct teaching in which the heated fluid from the TES system is directly combined with the primary working fluid.

As noted above, the TPCHS of the present invention provides the turbine generation with an additional path for added flexibility, which results in further benefits. In current systems, grid operators may communicate with power-generating facilities and order temporary shutdowns to prevent an overflooding of the grid. The TPCHS 1000 allows unwanted generation of electricity at generator 1009 to be routed towards charging the TES 1001 instead of requiring a shutdown of the turbine 1002 (see dashed line in FIG. 8). As explained above, a high pressure turbine 1031 is optionally provided to generate electricity, as well as low to intermediate pressure steam that can be provided to the turbine 902.

The waste heat is provided to the TPCHS 1000 as the primary heat source at 1005 with a temperature that may be in a range of 200-250° C. The temperature of the cycle working fluid as it exits the pump 1004 is at about 30° C. The heat exchanger 1006 uses the waste heat 1005 to heat the cycle working fluid to produce steam at about 150° C. The hot gas discharged from the TES 1001 has a temperature on the order of 1200-1500° C. The hot gas stream from the TES transfers heat to the cycle working fluid to superheat or boost the temperature of the steam to about 350-400° C. The now boosted temperature of the steam at the turbine inlet increases the heat-power efficiency of the thermal power cycle. It will be understood that these temperatures are examples only, and many ranges are possible for each, depending upon the particular application.

Organic Fluid Waste Heat Recovery

A system according to the present disclosure can also be applied to an Organic Rankine Cycle for waste heat recovery, with functional differences being the lower temperature of the baseline cycle and the different thermodynamic properties of the organic working fluid. The present invention can also be applied in low-temperature waste heat recovery applications, enabling the use of a higher temperature steam. The waste heat available may be too low to generate steam, but it can be used to preheat the water before the thermal storage system adds heat to generate the steam for the turbine inlet. Steam cycles are generally less expensive and more efficient. Hence, the heat is captured and used in a higher efficiency thermal power cycle because of the thermal power system.

Waste Heat Recovery Using Direct Heating

As an alternative to the use of indirect heating, such as radiation or convection of the heat from the heated fluid generated by the TES system ("TES fluid"), the inventive system and methods may also include direct heating of the first working fluid. More specifically, the TES fluid is directly combined with the first working fluid, so as to boost the temperature, pressure and mass flow of the first working fluid. The resulting fluid can be provided as an input to an industrial application that uses the boosted first working fluid as a direct input. The waste heat generated by the industrial application is then recirculated, and optionally combined with a primary heat source, as the first working fluid. According to this embodiment, the first working fluid and the TES fluid have the same composition, such as steam or hot air.

Figure 10A:
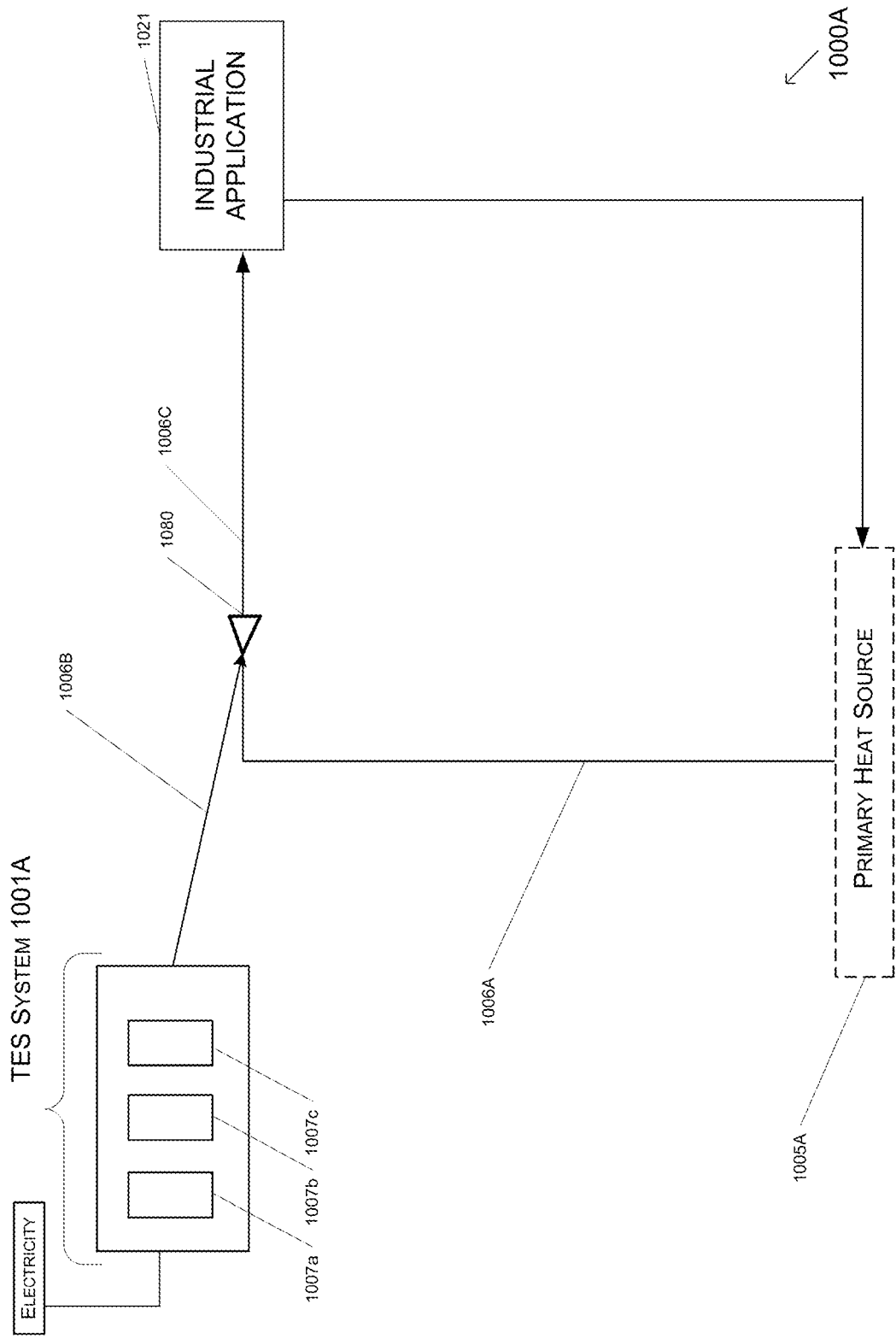
FIG. 10A is a schematic diagram showing the TPCHS in accordance with another implementation, directed to direct heating of the primary working fluid.

As shown in FIG. 10A, a TES system 1001A is provided, as explained above. The TES system 1001A according to this embodiment generates a hot fluid 1006B having the same composition as the first working fluid 1006A. For example, both of the fluids 1006A, 1006B may be steam, hot air or another fluid that is used by an industrial application. The result of the direct injection of the hot fluid 1006B from the TES system 1001 into the first working fluid 1006A is a boosted first working fluid 1006C. A thermocompressor 1080 is provided, such that the low-pressure vapor 1008A is entrained by the high-pressure injected vapor 1008B.

The boosted first working fluid 1006C has a higher specific enthalpy, and is more efficient than indirect approaches to boosting of the first working fluid 1006A. It should be noted that because the injection of the hot fluid 1006B is direct, the heat exchanger associated with the indirect options of conductive, convective and/or radiative heating is eliminated. More specifically, the lower pressure first working fluid 1006A is combined with the hot fluid 1006B having a matching chemical composition to the first working fluid 1006A. The boosted first working fluid 1006C is an intermediate pressure stream having a higher temperature, pressure and mass flow than the first working fluid 1006A. The intermediate pressure stream is provided to the industrial application for, and the post-process stream is recaptured, and optionally combined with a primary heat source 1005A, to be fed back as the first working fluid 1006A.

One example of an industrial application that may use this direct heating approach is a dairy facility. For example, a dairy facility may use steam as an input at about 5 bar pressure, perform an industrial process, and exhaust waste steam at about 1 bar pressure. The high pressure steam 1006B (e.g., 100 bar pressure) combined with the low pressure vapor 1006A creates steam having an intermediate pressure of about 5 bar. As explained above, a heat exchanger is not required because the steam 1006B is directly injected into the low pressure vapor 1006A. The output exhaust waste heat steam is recaptured, and fed back into the process as the low pressure vapor 1006A.

While the above thermal vapor recompression (TVR) process is directed to an industrial application, it does not include a turbine and generator, and therefore is not a Rankine cycle. However, the inventive system and methods is not limited to the above approach, and a turbine and generator may be combined with the industrial application. According to such an approach, the intermediate pressure stream 1006C is split between the industrial application and a turbine, such that the industrial application and the Rankine cycle are applied together. The turbine and generator operate as explained above. Additionally, the electrical energy may be fed back as an input to the TES system 1001A based on one or more parameters, as explained above with respect to FIG. 8.

While the above example uses steam as a fluid, other fluids may be used instead, depending on the industrial application. For example, instead of having low pressure vapor as the primary working fluid, hot air may be substituted. For example, an exhaust gas at a lower or intermediate temperature that is below the temperature of an industrial process, higher than the temperature of ambient air, may be provided as the primary working fluid. The output fluid of the TES system may be hot air, which heats up the exhaust gas, so as to provide a boosted stream of hot gas having an intermediate temperature and pressure, as required by the industrial process.

The foregoing splitting of the stream of boosted primary working fluid is not limited to the direct heating approach, and can be used in an indirect heating approach such as convection or radiation, as explained above.

Geothermal

For geothermal power systems which typically operate with low to medium geothermal heat sources, the combination with high temperature heat from a TES system per the current innovation produces much more electric power per unit of low-temperature heat, and much more electric power is produced per unit of high-temperature heat, than if such systems were operated independently. The operation of a TES combined with a geothermal or other low- to medium-temperature heat source under a controller can maintain proper operating conditions for a thermal power cycle across a wide range of heat source flow and temperature characteristics, and thus ensure the long-term reliability of the power plant. If the geothermal resource temperature is normally low, or has become lower due to geothermal well degradation, the TES can boost the cycle temperature and allow the plant to operate at a higher efficiency per mass of geofluid pulled from the resource. This can help with the problem of overuse of the geothermal resource leading to resource degradation, which ultimately shortens the lifespan of the plant.

Geothermal energy is a promising renewable energy source, likely to play a large role in the global transition to a carbon-free world. Geothermal energy can be harnessed for heating and cooling, but the present application focuses on geothermal energy for power generation. There are three main categories of geothermal power plants: vapor-dominated power cycles, liquid-dominated power cycles, and binary power cycles. These types of plants all have their own benefits and drawbacks, and which category is employed depends upon the geothermal reservoir condition that a given plant uses. There is currently broad usage of the liquid- and vapor-dominated power cycles, or flash and dry steam plants respectively; they make up over 70% of existing geothermal plants. In flash plants, hot high-pressure water is pumped from a geothermal well and is then flashed to a lower pressure in order to generate vapor. The resultant low-quality steam is expanded across a turbine to generate electricity. The unused water is then reinjected into the reservoir to maintain the geothermal resource where the cooled fluid is reheated over time by the Earth.

Dry steam plants operate with a similar mechanism, except that no flashing is needed as steam is naturally produced by the geothermal resource. The binary power cycle is generally used in lower geothermal resource temperature areas or as bottoming cycles to flash (liquid-dominated) geothermal power cycles.

The relationship between flash/dry-steam plants and binary cycles is analogous to the relationship between traditional steam Rankine cycles and Organic Rankine Cycles described earlier. When the resource temperature is low, due to either low geothermal resource temperature or due to prior expansion in a flash geothermal plant, the boiling point of water becomes an issue. In order to use the heat in an expansion turbine, the feed must be able to generate vapor. If the temperature is too low, the resource indirectly exchanges heat with a lower boiling point working fluid. This working fluid is vaporized and expanded across a turbine in a closed loop with the geothermal fluid pumped back into the subsurface after heat exchange. Accordingly, binary cycles involve Organic Rankine Cycles. The present invention also enables the use of a low temperature geothermal resource in a traditional steam Rankine cycle instead of needing to use an organic Rankine binary cycle. The thermal storage system can boil and superheat the hot geofluid for use in a more efficient steam Rankine cycle.

Overall, this process turns out to be extremely reliable, as geothermal power plants are environmentally very benign. On average, geothermal power plants operate at capacity factors that are unmatched by other types of large-scale power generation, traditional or renewable. Wind may not blow every day and sunlight is not always available, but the heat under the Earth's surface is not limited by weather or diurnal cycles. Additionally, geothermal power plants are extremely clean. Of all power generation technologies, geothermal has the second-lowest rate life cycle emissions per unit electrical energy, trailing wind power by a slight margin.

Despite the many benefits of geothermal power, there are a few drawbacks, one of which is related to Carnot efficiency. The efficiency of these power cycles is directly related to the difference between the temperature of the reservoir and the cold side temperature of the condenser. The problem is that geothermal power cycles usually have relatively low temperatures and pressures, leading to low efficiency. One effect is high amounts of condensation within the expansion stage (turbine stage). The condensed water droplets damage the turbomachinery leading to an increase in maintenance costs and downtime. This also affects capital cost of the plant, as many plants have an extra unused turbine on site to substitute in when maintenance is required on the active turbine. This, along with the efficiency loss due to relatively low temperatures and pressures, leads to very large and expensive plants with high capital costs and water loss. The water loss contributes to reservoir depletion, which eventually leads to the plants needing to operate under capacity. The targets of the power purchase agreements (PPAs) of these plants can thereby be missed, which results in the plant owners being charged for the shortfall (per MWh not delivered). These risks, along with the aforementioned capital costs, makes geothermal an unattractive option for many users. Existing plants are pressured to maintain capacity in an unsustainable fashion for the duration of the PPA, accelerating the rate of depletion of the reservoir. In California and Nevada, more than 37 geothermal plants have been plugged and retired between 2016-2021 for reasons such as the above, with even more being put in idle (though not fully retired) during that same period.

Introducing high-temperature TES provides solutions to several core problems of geothermal power plants. The TES would raise the temperature of the geofluid at some stage in the cycle before the turbine inlet and would allow for turbine operation at higher pressures and higher efficiencies. The heat may be added after the existing flash tank separator to a pure steam flow (for liquid-flash and binary cycles only), directly before the turbine inlet. This integration would allow the plant to use less geofluid for the same power generation capacity, slowing the rate of depletion of the geothermal resource.

With the use of a TPCHS as described, geothermal power plants would also have more operational flexibility by being able to store generated electricity on site at times when electricity prices are low.

Flash geothermal plants, the most abundant type, face many problems related to the lack of superheating. Saturated steam is fed to the turbine, meaning that condensation begins immediately as the steam is expanded. The result is less power being generated per mass of steam flow and increased maintenance cost (along with larger and more expensive turbomachinery equipment). The TPCHS described herein allows the steam to be superheated renewably, when the electricity charging the thermal storage is renewably sourced or charged from the plant's output as discussed earlier. This may require a modification of the existing cycle infrastructure to fit the new temperatures and pressures.

The impact of TES integration will vary from site to site. Three main factors will affect the effectiveness of an integration: type of geothermal plant, geothermal well quality (quality of the geothermal resource), and electric market conditions to which the power plants must sell to.

Figure 11:
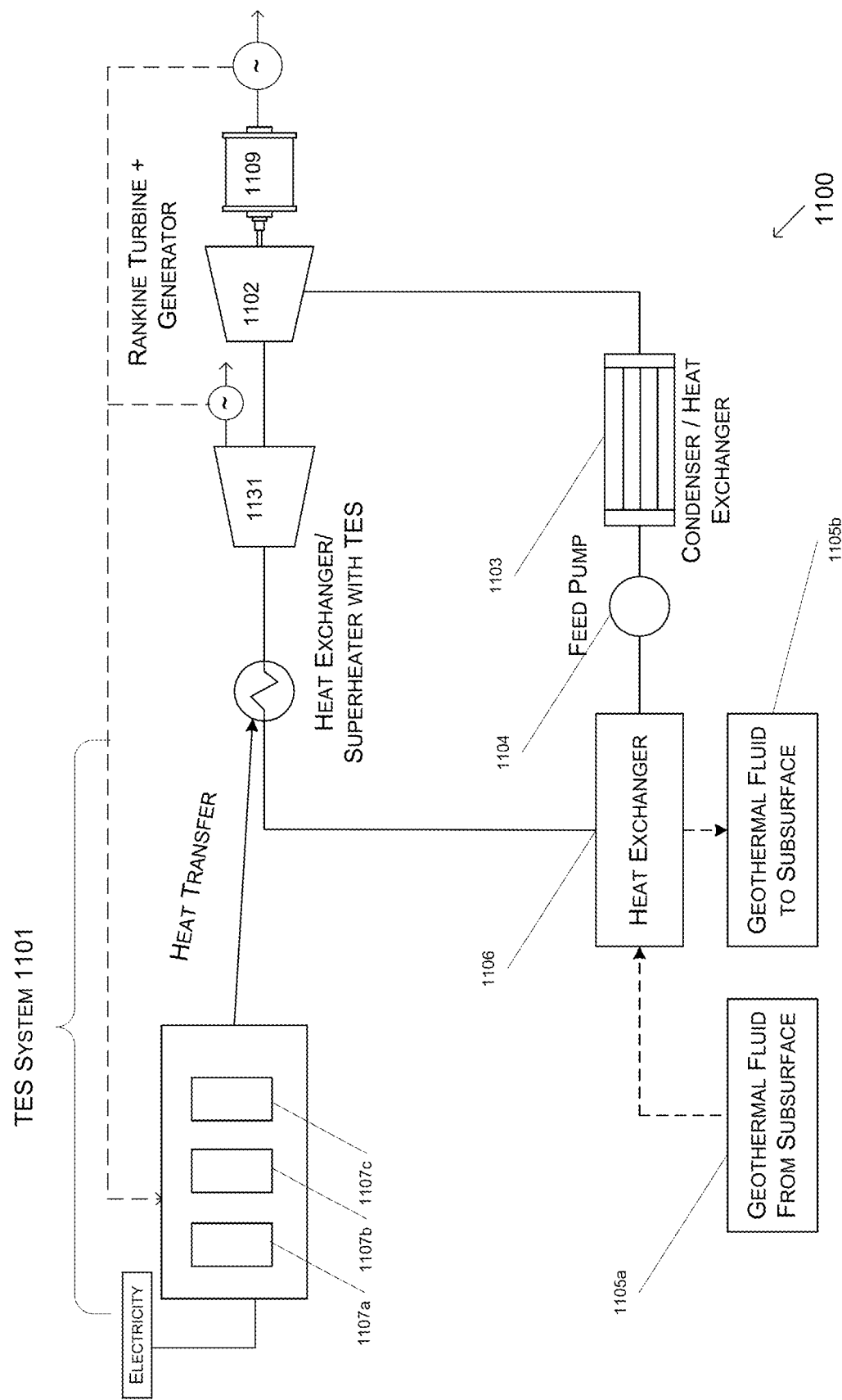

FIG. 11 shows an application of the inventive TPCHS 1100 with a Binary Rankine cycle for geothermal applications. The main difference here is the source of the heat, which in this case is a primary resource rather than waste heat as in examples described above. Geothermal fluid 1105a is pumped out of the subsurface at a temperature (significantly hotter than ambient), where it provides heat to the organic Rankine working fluid indirectly via heat exchanger at 1106. In this diagram, the Rankine working fluid is represented by the solid line connecting elements 1106, 1108, 1102, 1103 and 1104, and flows clockwise, in the same manner as described above for FIGS. 8, 9 and 10.

When sufficient heat is extracted from the geothermal stream to generate the desired quality vapor of the Rankine cycle working fluid, the geothermal fluid is pumped back into the subsurface as shown at 1105*b*. By not using the geothermal fluid as the working fluid, disadvantages such as scaling due to the mineral content of the geothermal fluid can be avoided. The TES 1101 provides heat via internal heat exchanger 1108 to the vaporized working fluid to further lift the temperature of the vaporized working fluid prior to the working fluid's entry into the turbine 1102 of the process. As explained above, the turbine 1102 powers a generator 1109, which generates electricity to be provided to grid operators, as well as being fed back as an input to the TES system 1101, depending on one or more parameters.

In the implementation shown in FIG. 11, the TES 1101 supplies heat for the superheating of the working fluid. In other implementations not shown the TES may be used to preheat the geothermal resource stream prior to its entry into the heat exchanger 1106. Additionally, the TES may transfer heat to the cycle working fluid and/or to the geothermal fluid radiatively, convectively, or a combination of the two.

In exemplary embodiments where the TES unit uses hot gas discharge as a medium for convective heat transfer, the temperature of the TES gas flow provided to the heat exchanger 703 may be, for example, approximately 600-700° C., which superheats the Rankine working fluid. The exit temperature of the TES air flow from heat exchanger 1108 will be considerably lower, for example around 200° C. The geothermal fluid temperature flowing into the heat exchanger 1106 may be perhaps 70-150° C. (depending upon local geothermal conditions). The temperature of the Rankine cycle working fluid leaving the pump 1104 is at about 25° C. It will be understood that these temperatures are examples only, and many ranges are possible for each, depending upon the particular application. As explained above, a high pressure turbine 1131 is optionally provided to generate electricity, as well as low to intermediate pressure steam that can be provided to the turbine 902.

Dual Fluid Implementation of ORC and Steam Cycle

Figure 11A:
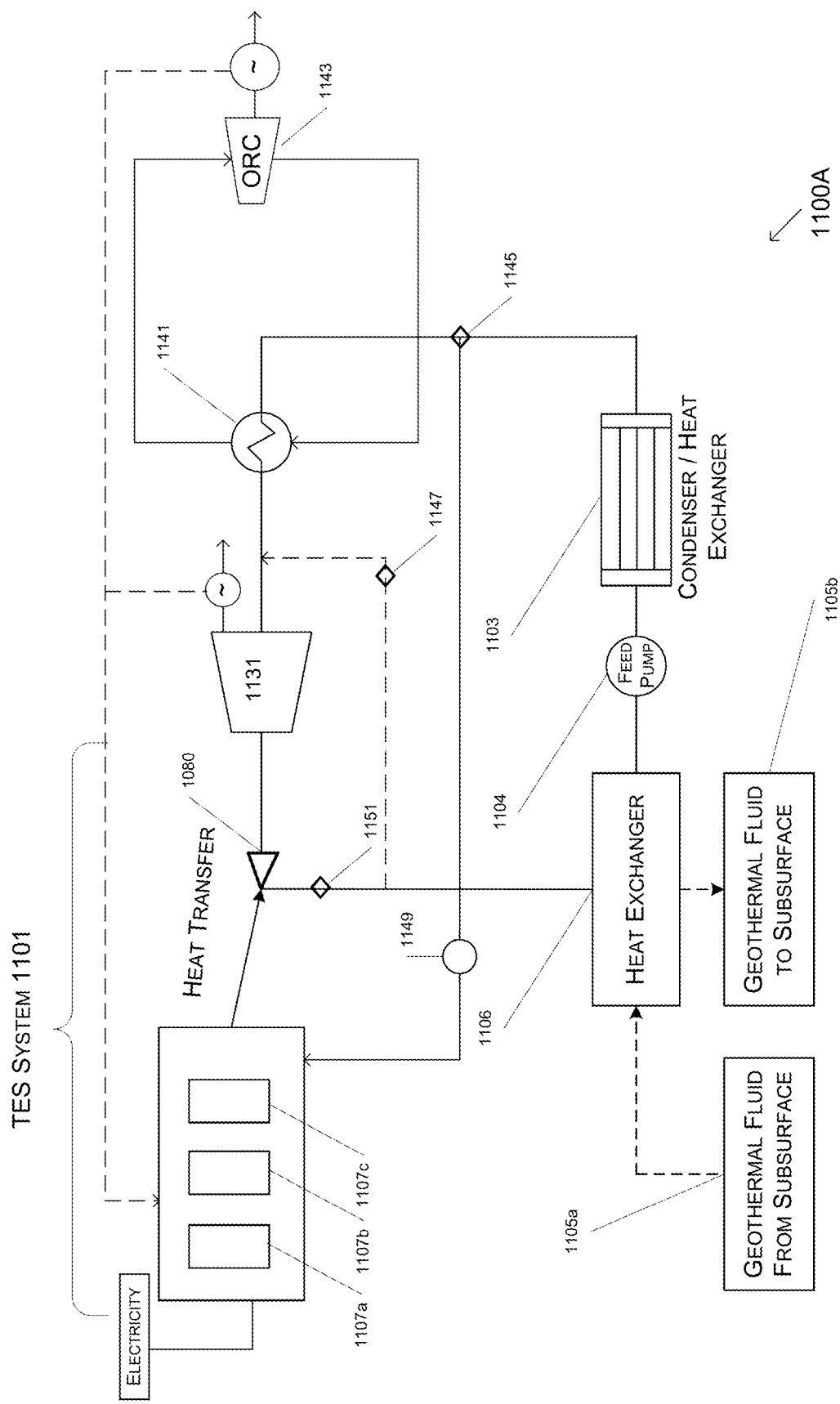
FIG. 11A illustrates a schematic diagram of a TPCHS showing the integration of a thermal energy storage system with a dual fluid geothermal Binary Rankine power cycle.

FIG. 11A shows an application of the inventive TPCHS 1100A with a Binary Rankine cycle for geothermal applications, with a hybridized dual fluid implementation including a TVR process. The TES system 1101 is operating as a steam generator, to provide high pressure steam to a high pressure turbine to generate electricity, and to provide the byproduct low to intermediate pressure steam as the input for a heat exchanger in a separate organic Rankine cycle including an ORC turbine. The byproduct steam of the heat exchanger is fed back to be heated by the geothermal fluid, or as the input to the steam generator associated with the TES system 1101. The features having the same reference numerals as discussed above in FIG. 11 are not repeated, for the purpose of brevity and clarity.

More specifically, an organic working fluid is circulated between a heat exchanger 1141 and an ORC turbine 1143, so as to generate an electricity output, such as for the grid or as an input to the TES system 1101 steam generator, including a pump 1149. Additionally, the TES working fluid (i.e. the steam which is out from the TES system steam generator) is provided as an output in a TVR process that directly injects the steam by way of thermocompressor 1080, and is combined with the primary working fluid, which is in this case steam. The steam output is provided to a high pressure turbine 1131, which produces electricity, as well as byproduct steam that is of low to intermediate pressure. The low to intermediate byproduct steam is provided to the heat exchanger 1141, which heats the organic working fluid.

The waste heat from the heat exchanger is output as steam or vapor, and the flow is controlled by valve 1145 to be split between providing a return input to the TES system 1101 and providing an input to the condenser 1103, feed pump 1104, and heat exchanger 1106 to serve as the primary working fluid. At thermocompressor 1080, the primary working fluid is again combined with the steam generated by the TES system 1101. The purpose of the splitting of the flow is to maintain the mass flow between the primary working fluid and the TES working fluid. Optionally, the primary working fluid, which is at a low to intermediate pressure, may be directly provided to the heat exchanger 1141 by the operation of valves 1147, 1151, depending on the operation of the TES system 1101. In other words, the TPCHS 1100A may operate when the TES system 1101 is off-line as well. Advantages of the above approaches include an increase in the efficiency of the storage unit due to the lower temperature inlet water, and the higher thermal storage efficiency, as well as a high storage capacity.

Figure 11B:
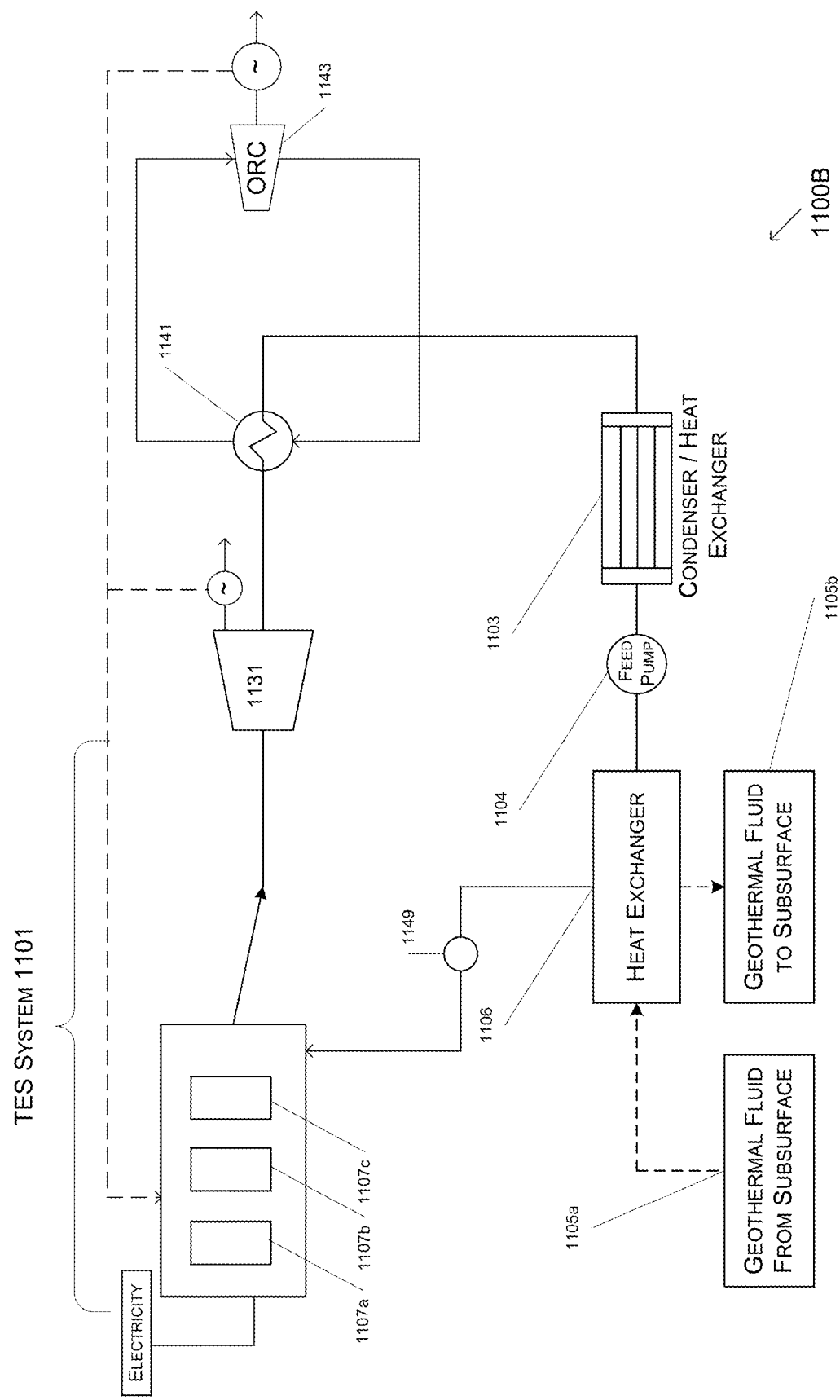
FIG. 11B illustrates a schematic diagram of a TPCHS showing the integration of a thermal energy storage system with a dual fluid geothermal Binary Rankine power cycle.

FIG. 11B shows a application of the inventive TPCHS 1100B with a Binary Rankine cycle for geothermal applications, with a hybridized dual fluid implementation in which the primary working fluid is circulated in a single loop. The features having the same reference numerals as discussed above in FIG. 11A are not repeated, for the purpose of brevity and clarity. It should be noted that the thermocompressor 1080 is not present, and further, the valves 1143, 1145 are not required because the primary working fluid and the TES working fluid are the same.

According to this implementation, the primary working fluid is heated at the heat exchanger 1106, and then passed to the TES system 1101 as the input to the steam generator, including pump 1149. After being heated by the TES system 1101, the resulting high temperature, high pressure steam is output to the high pressure turbine 1131, which generates electricity and low to medium pressure steam, as explained above. The low to intermediate pressure steam is provided to the heat exchanger 1141, and the byproduct steam of the heat exchanger 1141 is provided as an input to the condenser/heat exchanger 1103 and feed pump 1104, and is heated by the heat exchanger 1106 with the geothermal fluid from the subsurface 1105*a*. Advantages of this embodiment include lower pumping power required for operation, and simplicity of integration.

Figure 12:
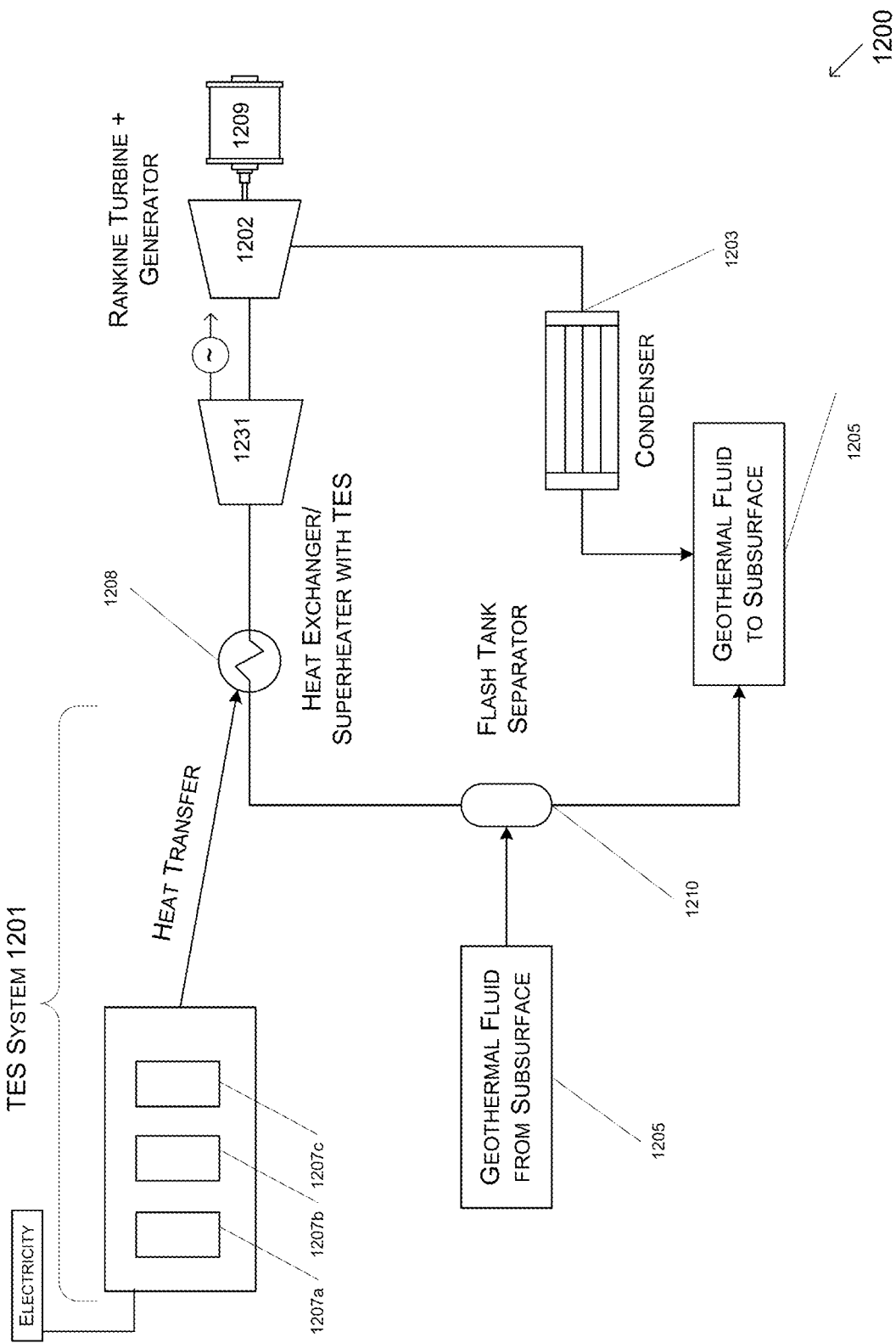

FIG. 12 represents the implementation of a TPCHS 1200 with an otherwise conventional geothermal steam cycle represented by flash tank separator 1210, Rankine turbine 1202/generator 1209 and condenser 1203. In liquid flash or dry steam processes, the geothermal resource stream is typically in the range of 150-250° C. It should be noted that the conventional geothermal steam cycle may further include a pump (not shown) after the condenser 1203. It should be noted that FIG. 4 shows a simplified diagram of a single-flash geothermal power plant. As before with the description of the earlier power cycle systems, the flow of the cycle working fluid is in the clockwise direction. Double and triple flash systems exist as well. Double flash means that after the turbine 1202, there is another flash tank separator (not shown), where the vapor product of that second flash tank is fed to a second, additional steam turbine. This is repeated yet again for a triple flash plant. As explained above, the turbine 1202 powers a generator 1209, which generates electricity to be provided to grid operators, as well as being fed back as an input to the TES system 1201, depending on one or more parameters.

In the multiple flash cases, the TES 1201 may exchange heat to superheat the product vapor of either one flash stage, all flash stages, or some combination of flash stages, by using multiple heat exchangers in the same manner as heat exchanger 1208. The flash tank 1210 operates in a conventional manner in which the inlet is a liquid-dominated geothermal fluid 1205. That is to say that the phase of the fluid is either all liquid or mostly liquid. The flash tank 1210 rapidly decreases the pressure of the stream, leading to the formation of vapor. That vapor rises out the top of the flash vessel as the Rankine working fluid, while the remaining liquid is dropped out the bottom to return to the subsurface 1205. As explained above, a high pressure turbine 1231 is optionally provided to generate electricity, as well as low to intermediate pressure steam that can be provided to the turbine 902.

The temperature of the geofluid prior to the flash stage is important, since a higher-temperature geofluid liquid will produce more vapor than a lower-temperature geofluid liquid, for a given flash pressure swing. The TES adds heat at heat exchanger 1208 to superheat the Rankine working fluid prior to inlet to the turbine 1202. The lower temperature steam at the turbine outlet is condensed to a liquid at 1203 prior to being returned to the subsurface 1205.

Figure 13:
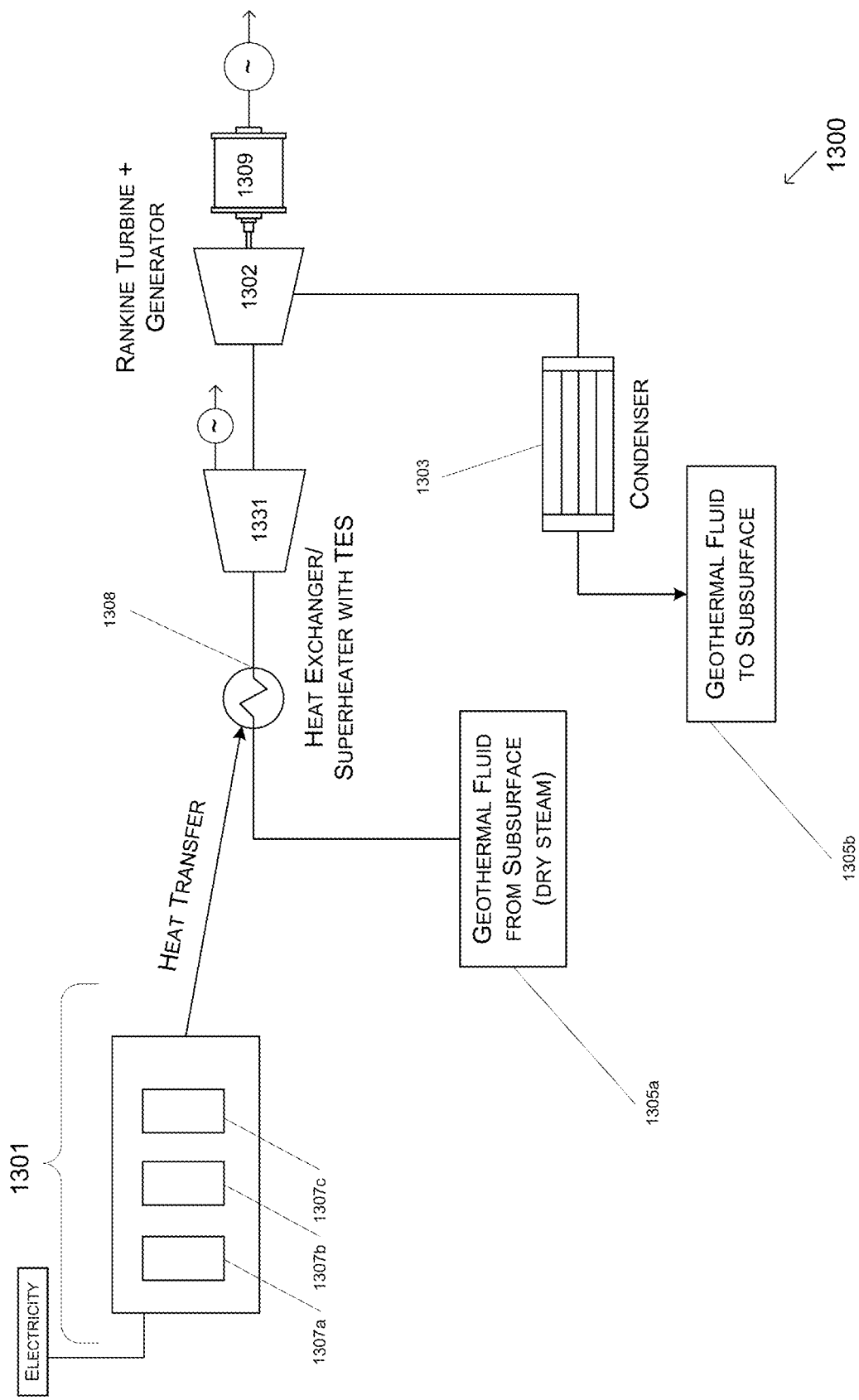

With reference to FIG. 13, there is shown a TPCHS 1300 for the dry steam process. In contrast to the prior described liquid flash process, there is no need for a preheater exchanger or flash tank separator as the source geothermal fluid 1305 is high-temperature dry steam that is pulled directly from the subsurface 1305*a*. As noted above, the geothermal resource stream 1305*a* is typically in the range of 150-250° C. in the dry steam process. Hence, for dry steam applications, the description is very similar to what is described for the general Rankine case. That is to say, the source geofluid (i.e., dry steam) 1305*a* is superheated by the addition of heat from the TES system 1301 at heat exchanger 1308 prior to entering the turbine 1302. The lower temperature steam that exits turbine 1302 is condensed at condenser 1303 before being returned to subsurface 1305*b*. As explained above, the turbine 1302 powers a generator 1309, which generates electricity to be provided to grid operators, as well as being fed back as an input to the TES system 1301, depending on one or more parameters. As explained above, a high pressure turbine 1331 is optionally provided to generate electricity, as well as low to intermediate pressure steam that can be provided to the turbine 902.

Biomass

Biomass steam plants are another example of a facility with a temperature-constrained thermal power generation cycle, though the origin of this constraint is different than the cases outlined above. Biomass steam plants import solid biomass, usually either woody forest residual waste or agricultural waste, and combust it in furnaces or boilers in order to generate steam for use in a thermal power generation cycle. The combustion temperature of the biomass is tightly constrained by both physical and operational factors. The physical factors are related to the fuel quality of biomass compared to other solid fuels such as coal. The comparison with coal is a relevant one because the power plant configurations are generally similar, and many facilities co-fire, or use a combination of coal and biomass, in order to satisfy environmental constraints.

For the same reason, some facilities have converted coal steam power plants into full biomass facilities. A limitation here is that biomass has a much lower heating value than coal. These lower heating values means that less heat can be generated per unit mass, and, as a result, lower flame temperatures limit the temperature that the steam generator sees. The present TPCHS addresses this constraint in cases where identical temperatures are desired by adding heat to the water-steam flow at some point in the boiler. This may add heat during the boiling stage, allowing an equivalent superheat temperature to be achieved by the biomass combustion. In other implementations, the thermal storage system may add heat upstream of the biomass boiler before the turbine inlet.

There will be operational constraints of the TPCHS on the power plant. First, the biomass combustion must produce temperatures that are high enough to satisfy the steam requirements of a system (if steam requirements for an existing plant exist). The air/fuel ratio (the mass ratio between air introduced in the burner versus the mass of fuel) can be altered to change the temperature of the flame. Too little air leads to unburnt fuel and formation of carbon monoxide (a regulated, potent greenhouse gas) in the flue gas. Too much air leads to higher temperatures, but the formation of nitrous oxide (NOx), a highly regulated emission that inhibits the formation of ozone which is an even more potent greenhouse gas.

A standard approach to achieve necessary temperatures is to increase the air fuel ratio. However, the temperature of the flue gas must stay below about 1100-1400° C. (depending on the type of biomass fired), in order to limit the formation of nitrous oxide (NOx) emissions. Air flow is linked to gas velocity in the biomass burner. Solid fuel is combusted in fluidized boilers or gas suspension furnaces, where a sufficient velocity of gas flow is required to suspend the solid material and allow operation as intended. Reducing air flow rate and gas velocity increases degradation of boiler tubes, since solid particles carried by the gas interact with the boiler tubes with greater momentum.

A minimum fluidization velocity is required to effectively suspend fuel in a fluidized bed. Additionally, biomass boilers must have enough air flow to operate at fuel-lean conditions, to limit physical degradation of boiler components and minimize unburned solid fuel waste. This means having an air/fuel ratio that is higher than the stoichiometric ratio. High gas velocities and oxygen composition produce an oxidizing environment for heat exchanger and boiler tube surfaces, leading to corrosion.

The above challenges lead to strict constraints that limit the boiler thermal output and can limit the type of biomass that can be used in this application. A thermal storage system according to the present disclosure can provide the benefits described above to the steam cycle, to either boost production and efficiency of an existing plant or replicate steam conditions of an existing steam-coal plant that is being converted to biomass.

TPCHS Efficiency Gains

Figure 14:
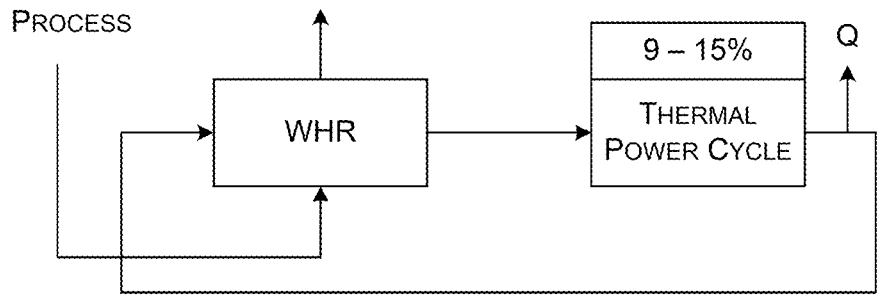

FIG. 14 shows a simplified conventional process of a waste heat recovery thermal power cycle. The waste heat recovery (WHR) section may include a heat exchanger that captures waste heat (e.g., a flue gas stream) from some process. The waste heat is recovered by heating the power cycle working fluid to produce steam. The waste heat is conventionally low-temperature, with the consequence that the thermal power cycle (e.g., turbine+condenser) is operating at a low efficiency: perhaps 9-15% of the thermal energy recovered is converted into electrical energy in the power cycle. The efficiency is a measure of the electricity output (kJ electric out) per unit of low- to medium-temperature heat (kJ heat in).

Figure 15:
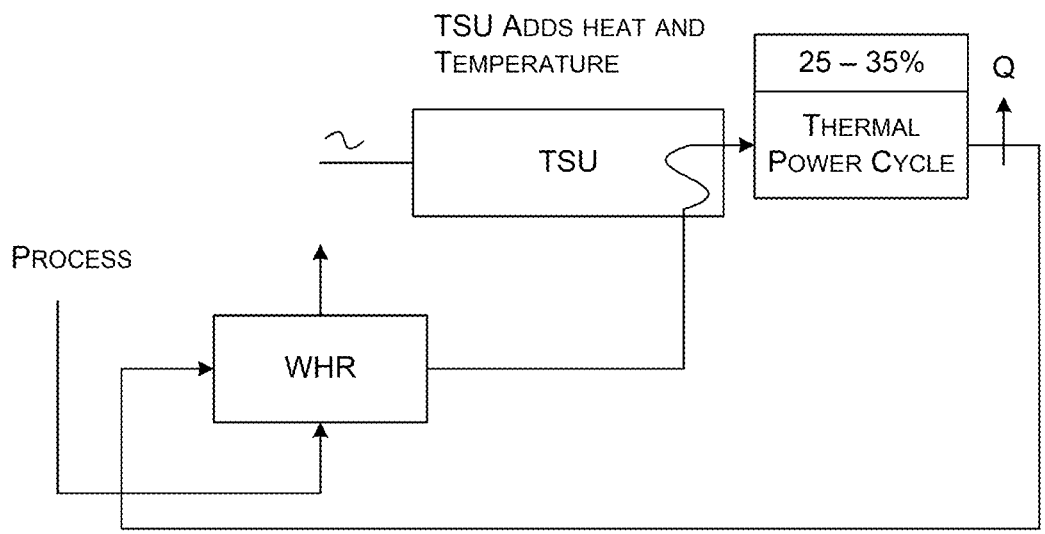

FIG. 15 shows a simplified process diagram of the inventive thermal power cycle high-efficiency system TPCHS in which a thermal energy storage (TES) system is integrated with a waste heat recovery thermal power cycle of FIG. 14. As described above, the TES system adds heat to the cycle working fluid at a higher-temperature than the temperature of the existing waste heat resource, allowing the inlet temperature for the thermal power cycle (turbine+condenser) to be higher. This allows a new, more efficient cycle (new cycle equipment for new cycle conditions), with the same waste heat resource available providing the source heat. The TES system is shown to charge electrically. The boosted temperature of the cycle working fluid provided by heat exchange with hot gas discharge from the TES prior to entering the turbine stage of the thermal power cycle allows the thermal efficiency of the cycle to be improved (to 25%-30%, for example).

Figure 16:
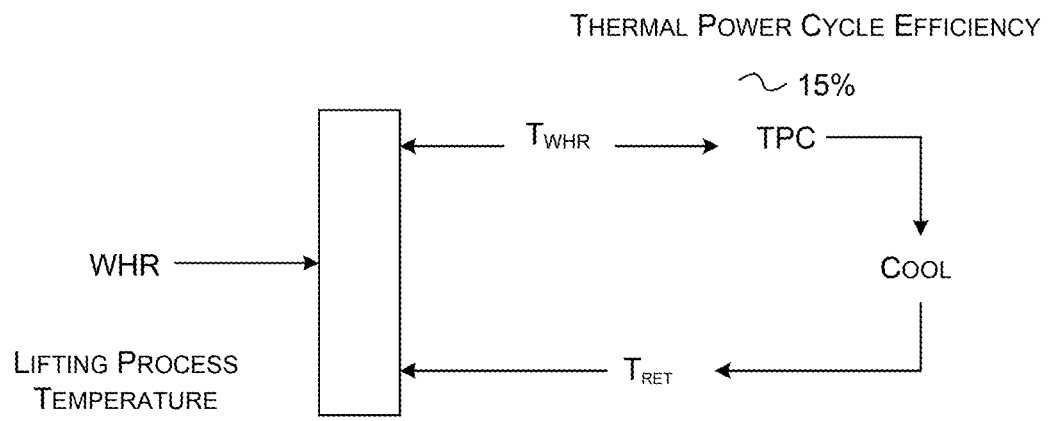
Figure 17:
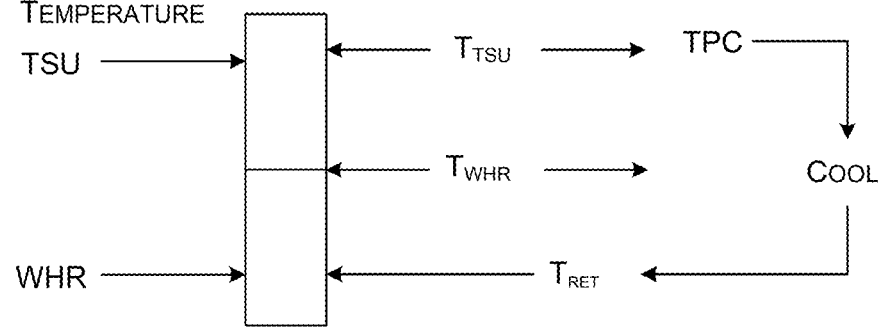

FIGS. 16 and 17 provide another view of the benefits of the inventive system. FIG. 16 shows a conventional process with the waste heat recovery WHR resource able to lift the thermal power cycle return temperature ($T_{ret}$) to the temperature of the waste heat resource ($T_{whr}$). Limitations on the temperature of the resource also limit the maximum efficiency of the power cycle. In the inventive system shown in FIG. 17, the existing temperature boost of the waste heat recovery WHR shown in 16 is present, but now the thermal energy storage system (TES) can lift the temperature further. This removes the upper limit on the temperature and, assuming $T_{ret}$ is relatively constant, the efficiency of the thermal power cycle (TPC) improves.

Figure 18:
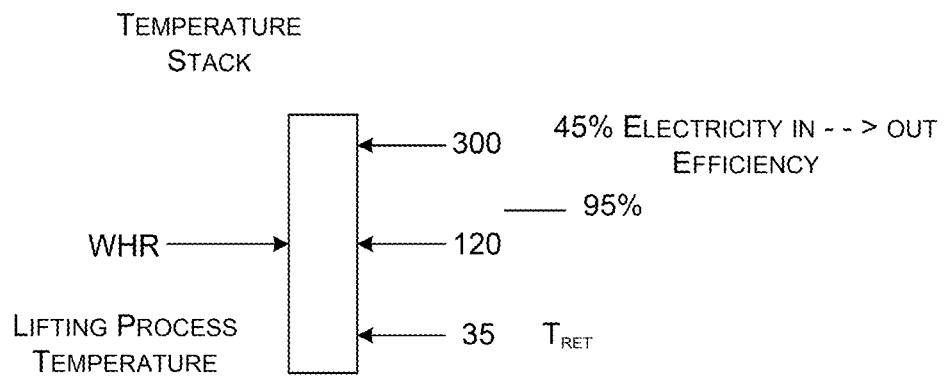

FIG. 18 further demonstrates the benefits of the combined WHR and TES system. On a power generating efficiency basis (the units of electrical energy that are generated divided by the amount of energy input to the system—in this case, thermal energy), the inventive system is more efficient than either component would accomplish alone. The thermal storage unit takes electricity as input, and stores and discharges the energy from the electricity in the form of heat. Without an existing heat source to add on, the TES would need to supply heat alone to a thermal power cycle in order to regenerate electrical power.

Figure 19:
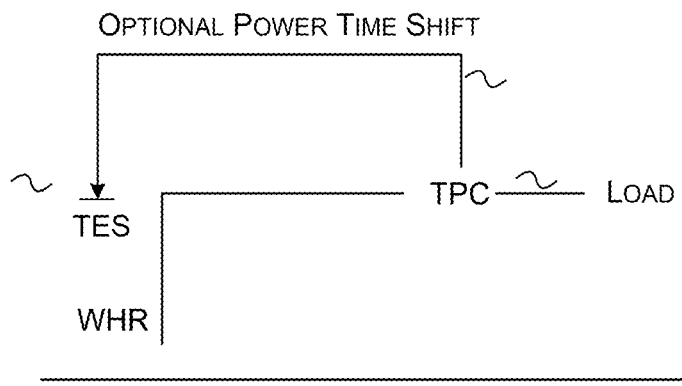

FIG. 19 illustrates the ability that the thermal energy storage system gives a power cycle generator to optionally time-shift the power output in applications where the value or demand of electricity (e.g. grid electricity) is time-varying. As discussed above in connection with FIG. 8, the TPCHS of the present invention provides the turbine generation with an additional path for added flexibility, wherein unneeded generation of electricity can be routed towards charging the TES instead of requiring a shutdown of the power cycle. The rerouted electrical energy is converted to heat and stored thermally in the TES, avoiding the need to sell electricity immediately at low-value or low-demand times. Various heat sources are continuous by nature (waste heat in a continuous industrial process, geothermal, nuclear, etc.), and this system allows the time-shifting of the output power even where the input is continuous, or over time periods that do not coincide with the output power time periods. The TES system thus allows constant utilization of the continuous thermal resource in a thermal power cycle while also enabling a higher efficiency power cycle.

Generally, the overall efficiency of electricity input (from charging) to electricity output (from generating) equals the storage efficiency (the amount of energy available after storage, i.e. taking into account the amount lost in the storage process) times the power cycle thermal efficiency (i.e., the efficiency of producing the power using the added heat, e.g. the net electricity output divided by the heat added to the system). When paired with a waste heat recovery application, the waste heat will generally have a lower cost than the electricity used to charge the thermal storage unit. When the thermal storage system discharges heat to a power cycle with WHR integration, the electricity-in to electricity-out efficiency will effectively increase, compared with the cycle on its own (possibly 36% on its own, increasing to 45% for example). The waste heat recovery system, as discussed before, would suffer with low conversion efficiencies on its own, due to its temperature-constrained nature.

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

While foregoing example implementations may refer to "air", including $CO_2$, the inventive concept is not limited to this composition, and other fluid streams may be substituted therefor for additional industrial applications. For example but by way of limitation, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the necessary properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A thermal energy storage (TES) system, including:
a thermal energy storage medium configured to store thermal energy generated by conversion of input electrical energy from a renewable energy source;
a heat transfer system configured to transfer heat from the storage medium to a TES working fluid having a first temperature, so as to increase the first temperature of the TES working fluid, and to combine the TES working fluid at the increased first temperature with a thermal power cycle working fluid, where the thermal power cycle working fluid is heated to a second temperature by a heat source, thereby to generate a combined working fluid having a third temperature that is higher than the second temperature; and
a fluid input system configured to provide the combined working fluid to an industrial process.

2. A thermal energy storage (TES) system, including:
a thermal energy storage medium configured to store thermal energy generated by conversion of input electrical energy from a renewable energy source;
a heat transfer system configured to transfer heat from the storage medium to a TES working fluid having a first temperature, so as to increase the first temperature of the TES working fluid, and to combine the TES working fluid at the increased first temperature with a thermal power cycle working fluid, where the thermal power cycle working fluid is heated to a second temperature by a heat source, thereby to generate a combined working fluid having a third temperature that is higher than the second temperature; and
a fluid input system configured to provide the combined working fluid to an industrial process;
wherein
the industrial process includes a turbine configured to receive the combined working fluid.

3. The TES system of claim 2, wherein the turbine is connected to an electrical generator configured to generate electrical energy, the system being configured to return at least some of the electrical energy produced by the generator as input electrical energy to the TES system, based on one or more predetermined parameters.

4. The TES system of claim 3, wherein the one or more predetermined parameters include at least one of electricity price, carbon intensity and electricity demand.

5. The TES system of claim 2, further including a flash tank separator configured to vaporize the thermal power cycle working fluid.

6. The TES system of claim 2, wherein the thermal power cycle is either a Rankine cycle in which the thermal power cycle working fluid is water or a Brayton cycle in which the thermal power cycle working fluid includes supercritical $CO_2$.

7. A thermal energy storage (TES) system, including:
a thermal energy storage medium configured to store thermal energy generated by conversion of input electrical energy from a renewable energy source;
a heat transfer system configured to transfer heat from the storage medium to a TES working fluid having a first temperature, so as to increase the first temperature of the TES working fluid, and to combine the TES working fluid at the increased first temperature with a thermal power cycle working fluid, where the thermal power cycle working fluid is heated to a second temperature by a heat source, thereby to generate a combined working fluid having a third temperature that is higher than the second temperature; and
a fluid input system configured to provide the combined working fluid to an industrial process;
wherein the heat source includes one or more of: waste heat recovered from an industrial process, geothermal fluid received from a subsurface location, and heat generated by combustion of biomass.

8. A thermal energy storage (TES) system, including:
a thermal energy storage medium configured to store thermal energy generated by conversion of input electrical energy from a renewable energy source;
a heat transfer system configured to transfer heat from the storage medium to a TES working fluid having a first temperature, so as to increase the first temperature of the TES working fluid, and to combine the TES working fluid at the increased first temperature with a thermal power cycle working fluid, where the thermal power cycle working fluid is heated to a second temperature by a heat source, thereby to generate a combined working fluid having a third temperature that is higher than the second temperature;
a fluid input system configured to provide the combined working fluid to an industrial process; and
the TES working fluid has substantially the same composition as the thermal power cycle working fluid, wherein the combined working fluid has a mass flow greater than the mass flow of the thermal power cycle working fluid.

9. A thermal energy storage (TES) system, including:
a thermal energy storage medium configured to store thermal energy generated by conversion of input electrical energy from a renewable energy source;
a heat transfer system configured to transfer heat from the storage medium to a TES working fluid having a first temperature, so as to increase the first temperature of the TES working fluid, and to combine the TES working fluid at the increased first temperature with a thermal power cycle working fluid, where the thermal power cycle working fluid is heated to a second temperature by a heat source, thereby to generate a combined working fluid having a third temperature that is higher than the second temperature; and
a fluid input system configured to provide the combined working fluid to an industrial process;
wherein the increased first temperature of the TES working fluid is greater than the third temperature and a has a first pressure that is greater than the-pressure of the combined working fluid.

10. The TES system of claim 9, wherein the third temperature is greater than the second temperature, and the pressure of the combined working fluid is greater than the pressure of the thermal power cycle working fluid at the second temperature.

11. A thermal energy storage (TES) system, including:
a thermal energy storage medium configured to store thermal energy generated by conversion of input electrical energy from a renewable energy source;
a heat transfer system configured to transfer heat from the storage medium to a TES working fluid having a first temperature, so as to increase the first temperature of the TES working fluid, and to combine the TES working fluid at the increased first temperature with a thermal power cycle working fluid, where the thermal power cycle working fluid is heated to a second temperature by a heat source, thereby to generate a combined working fluid having a third temperature that is higher than the second temperature; and
a fluid input system configured to provide the combined working fluid to an industrial process;
wherein the thermal energy storage medium includes a refractory material.

* * * * *